United States Patent [19]
Ueda

[11] Patent Number: 6,034,730
[45] Date of Patent: Mar. 7, 2000

[54] MODULE SWITCHING TYPE PICTURE COMPRESSING AND REPRODUCING APPARATUS

[75] Inventor: Hiroaki Ueda, Tokyo, Japan

[73] Assignee: NEC Corporation, Tokyo, Japan

[21] Appl. No.: 08/917,849

[22] Filed: Aug. 27, 1997

[30] Foreign Application Priority Data

Sep. 6, 1996 [JP] Japan ................................. 8-257497

[51] Int. Cl.⁷ .................................................... H40N 7/26
[52] U.S. Cl. ........................................... 348/402; 348/384
[58] Field of Search ........................... 348/402; 710/100, 710/101, 102; 713/104, 1, 2

[56] References Cited

U.S. PATENT DOCUMENTS

| | | | |
|---|---|---|---|
| 5,748,980 | 5/1998 | Lipe et al. ............................... | 710/104 |
| 5,796,434 | 8/1998 | Lempel ..................................... | 348/402 |
| 5,819,115 | 10/1998 | Hoese et al. .............................. | 710/68 |
| 5,826,090 | 10/1998 | Mealey et al. ............................. | 713/2 |
| 5,838,981 | 11/1998 | Gotoh ..................................... | 707/203 |

FOREIGN PATENT DOCUMENTS

| | | |
|---|---|---|
| 63-234461 | 9/1988 | Japan. |
| 2-108119 | 4/1990 | Japan. |
| 5-233267 | 9/1993 | Japan. |
| 6-152922 | 5/1994 | Japan. |
| 8-214285 | 8/1996 | Japan. |

OTHER PUBLICATIONS

DeGall, "MPEG: A Video Compression Standard for Multimedia Applications," Communications fo the ACM, all, Apr. 1991.

Primary Examiner—Tommy P. Chin
Assistant Examiner—John Voisinet
Attorney, Agent, or Firm—Foley & Lardner

[57] ABSTRACT

A picture compressing apparatus compresses pictures which are classified into three types of pictures. They are an I picture that is intra-frame coded, a P picture that is forward inter-frame coded, and a B picture that is forward/backward inter-frame coded. An apparatus controlling device checks the ID of existing CPU 2 and the CPU ID of program currently created and determines whether or not they match. When the determined result is No, the apparatus controlling device extracts a compressed code of basic modules and differential modules corresponding to the existing CPU. With reference to a code table 17, a decoder decodes the compressed codes to generate an optimun program for the existing CPU. The picture reproducing apparatus performs the similar process to that of the picture compressing apparatus.

14 Claims, 26 Drawing Sheets

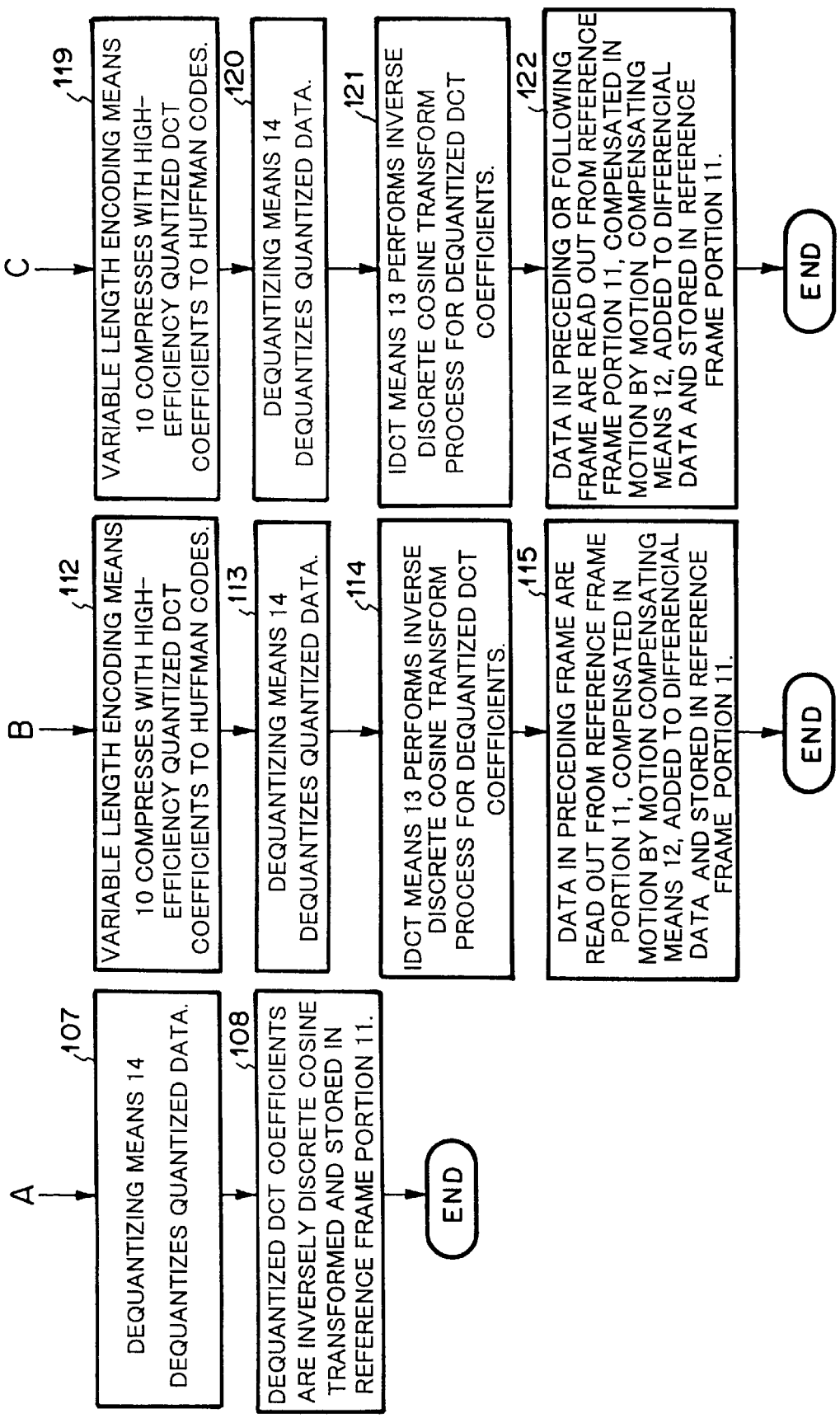

FIG. 7

```
         CREATING COMPRESSING PROGRAM
                     │
                     ▼                    ╭131
         ┌─────────────────────────────┐
         │ CREATING MODULE WITH ARGUMENTS│
         │   "EXISTING CPU ID" AND "YUV  │
         │         CONVERTING".          │
         └─────────────────────────────┘
                     │
                     ▼                    ╭132
         ┌─────────────────────────────┐
         │ CREATING MODULE WITH ARGUMENTS│
         │    "EXISTING CPU ID" AND      │
         │      "MOTION ESTIMATING".     │
         └─────────────────────────────┘
                     │
                     ▼                    ╭133
         ┌─────────────────────────────┐
         │ CREATING MODULE WITH ARGUMENTS│
         │   "EXISTING CPU ID" AND "MOTION-│
         │     COMPENSATED PREDICTING".  │
         └─────────────────────────────┘
                     │
                     ▼                    ╭134
         ┌─────────────────────────────┐
         │ CREATING MODULE WITH ARGUMENTS│
         │   "EXISTING CPU ID" AND "DCT".│
         └─────────────────────────────┘
                     │
                     ▼                    ╭135
         ┌─────────────────────────────┐
         │ CREATING MODULE WITH ARGUMENTS│
         │    "EXISTING CPU ID" AND      │
         │         "QUANTIZING".         │
         └─────────────────────────────┘
                     │
                     ▼                    ╭136
         ┌─────────────────────────────┐
         │ CREATING MODULE WITH ARGUMENTS│
         │    "EXISTING CPU ID" AND      │
         │    "VARIABLE LENGTH ENCODING".│
         └─────────────────────────────┘
                     │
                     ▼                    ╭137
         ┌─────────────────────────────┐
         │ CREATING MODULE WITH ARGUMENTS│
         │    "EXISTING CPU ID" AND      │
         │        "DEQUANTIZING".        │
         └─────────────────────────────┘
                     │
                     ▼                    ╭138
         ┌─────────────────────────────┐
         │ CREATING MODULE WITH ARGUMENTS│
         │  "EXISTING CPU ID" AND "IDCT".│
         └─────────────────────────────┘
                     │
                     ▼                    ╭139
         ┌─────────────────────────────┐
         │ CREATING MODULE WITH ARGUMENTS│
         │    "EXISTING CPU ID" AND      │
         │     "MOTION COMPENSATING".    │
         └─────────────────────────────┘
                     │
                     ▼
                   ( END )
```

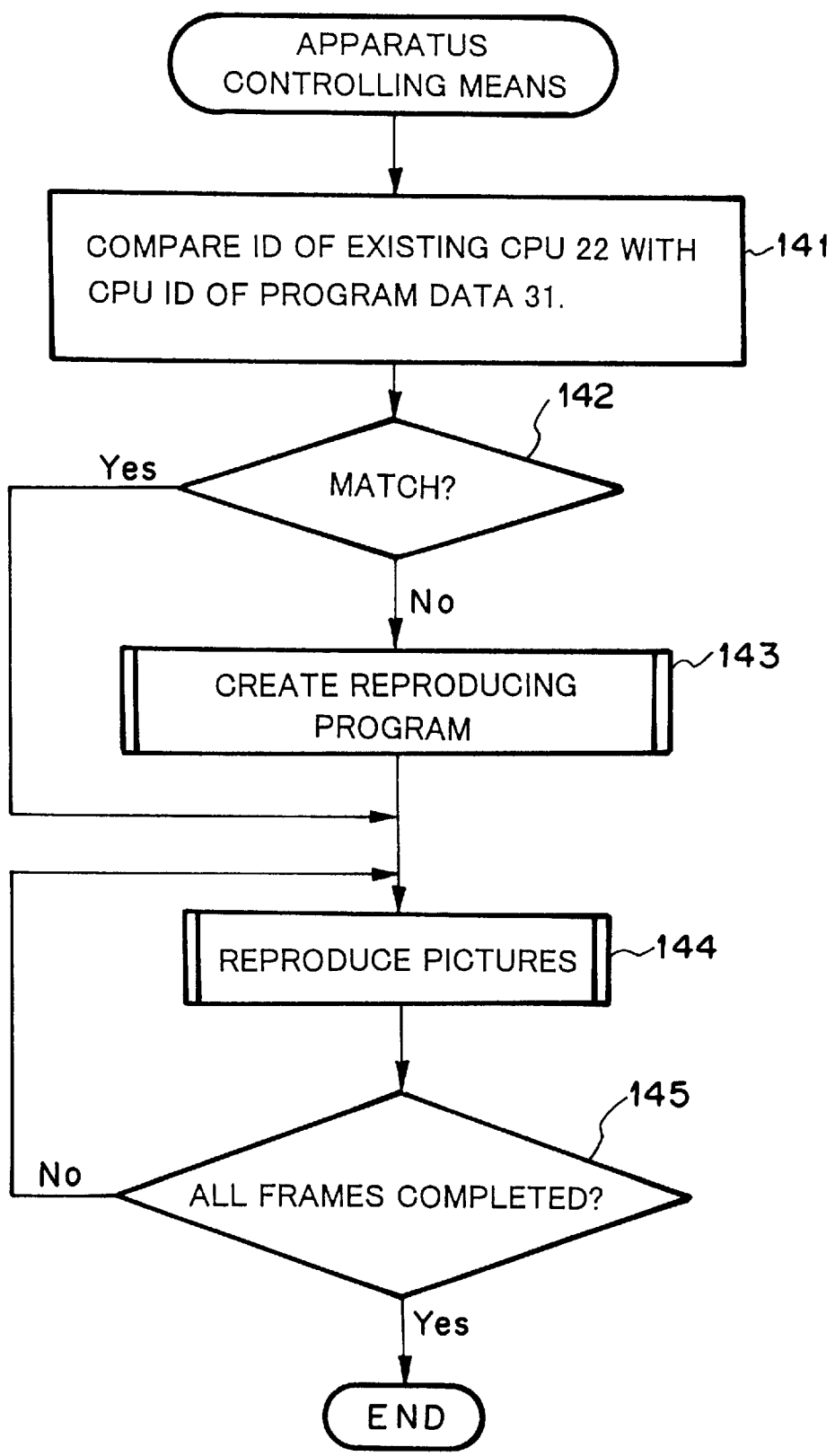

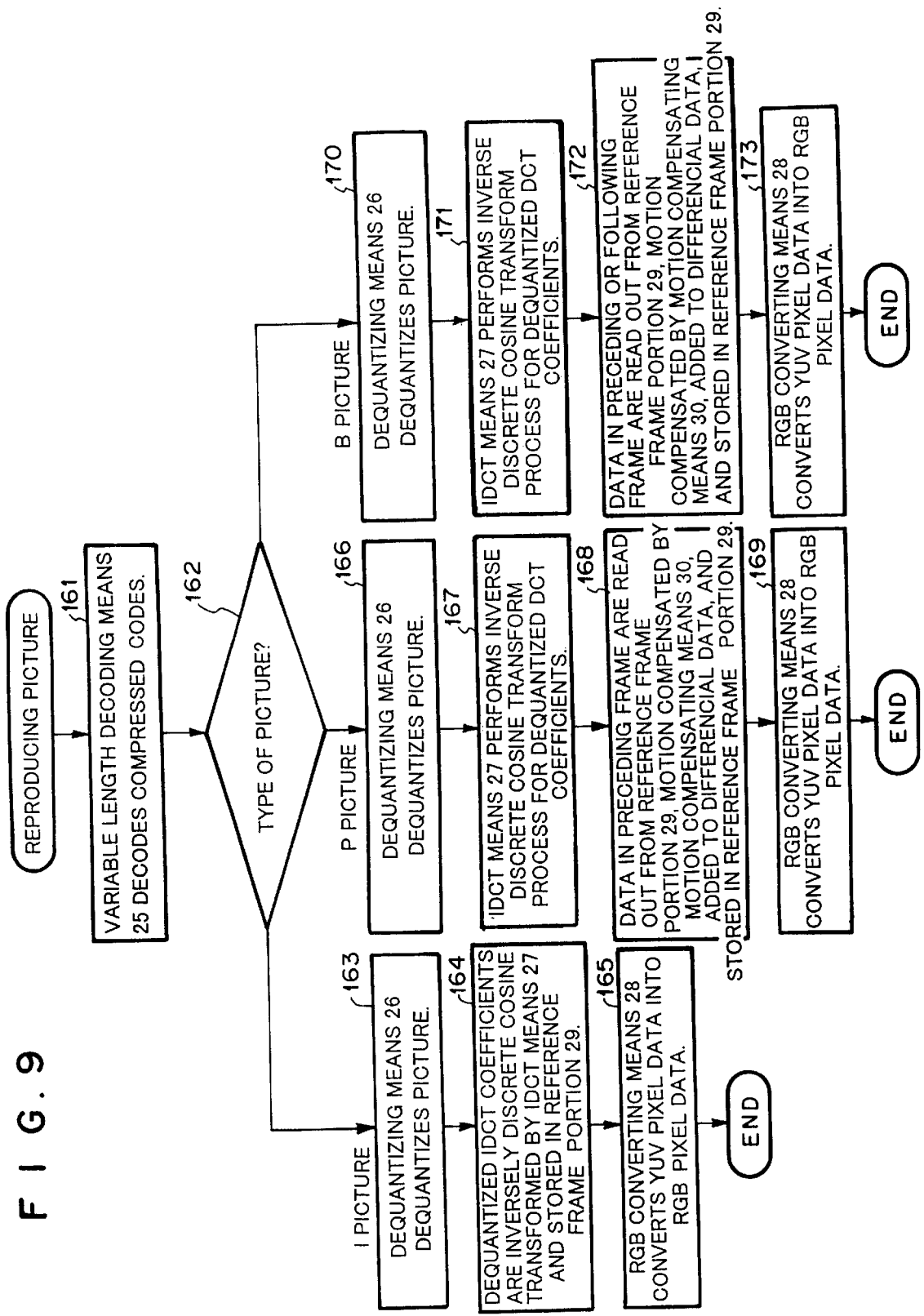

| OPERATION CODE | OPERAND |
|---|---|
| mov | ax, bx |

(B)

| DIFFERENCE CODE | | DESCRIPTION |
|---|---|---|
| 00 | — | NO CHANGE |
| 01 | — | CHANGING TYPES OF ALL REGISTERS FROM 32 BITS TO 16 BITS. |
| 02 | — | CHANGING TYPES OF ALL REGISTERS FROM 16 BITS TO 32 BITS. |
| 03 | — | CHANGING TYPE OF FIRST REGISTER FROM 32 BITS TO 16 BITS. |
| 04 | — | CHANGING TYPE OF FIRST REGISTER FROM 16 BITS TO 32 BITS. |
| 05 | — | CHANGING TYPE OF SECOND REGISTER FROM 32 BITS TO 16 BITS. |
| 06 | — | CHANGING TYPE OF SECOND REGISTER FROM 16 BITS TO 32 BITS. |
| 07 | " x x x x x | SUBSTITUTING OPERAND WITH OPERAND PRECEDED BY DIFFERENCE CODE. |
| 08 | " x x x x x | SUBSTITUTING FIRST REGISTER WITH REGISTER PRECEDED BY DIFFERENCE CODE. |
| 09 | " x x x x x | SUBSTITUTING SECOND REGISTER WITH REGISTER PRECEDED BY DIFFERENCE CODE. |
| 0A | " x x x x x | SUBSTITUTING OPERATION CODE WITH OPERATION CODE PRECEDED BY DIFFERENCE CODE. |
| 0B | " x x x x x | SUBSTITUTING INSTRUCTION OF EXISTING LINE WITH INSTRUCTION PRECEDED BY DIFFERENCE CODE. |
| 0C | " x x x x x | INSERTING INSTRUCTION PRECEDED BY DIFFERENCE CODE BETWEEN PRECEDING LINE AND EXISTING LINE. |
| 0D | x x , " x x x x " , " x x x x | SUBSTITUTING LINES FROM EXISTING LINE TO LINE OF NUMERIC VALUE PRECEDED BY DIFFERENCE CODE WITH PROGRAM CODE PRECEDED BY THE NUMERIC VALUE. |
| 0E | x x , " x x x x " , x x x x | INSERTING PROGRAM CODES PRECEDED BY NUMERIC VALUE BETWEEN PRECEDING LINE AND EXISTING LINE FOR NUMBER OF LINES DESIGNATED BY NUMERIC VALUE PRECEDED BY DIFFERENCE CODE. |
| 0F | — | DELETING EXISTING LINE. |
| 10 | x x | DELETING LINES FROM EXISTING LINE BY THE NUMBER DESIGNATED BY NUMERIC VALUE PRECEDED BY DIFFERENCE CODE. |
| 11 | — | EXCHANGING EXISTING LINE AND NEXT LINE. |
| 12 | x x | EXCHANGING EXISTING LINE AND LINE DESIGNATED BY NUMERIC VALUE PRECEDED BY DIFFERENCE CODE. |

```
0 0 1 0 ............... START LINE NUMBER FROM WHICH BASIC MODULE IS CHANGED.
0 0 1 4 ............... LAST LINE NUMBER TO WHICH BASIC MODULE IS CHANGED.
0 1 ................... CHANGING TYPES OF ALL REGISTERS FROM 32 BITS TO 16 BITS.
0 4 ................... CHANGING TYPE OF THE FIRST REGISTER FROM 16 BITS TO 32 BITS.
0 0 ................... NO CHANGE.
0 B "inc ax" .......... SUBSTITUTING EXISTING LINE WITH PROGRAM CODE PRECEDED BY DIFFERENCE CODE.
0 0 ................... NO CHANGE.
0 0 4 0 ............... START LINE NUMBER FROM WHICH BASIC MODULE IS CHANGED
0 0 4 5 ............... LAST LINE NUMBER TO WHICH BASIC MODULE IS CHANGED
0 6 ................... CHANGING TYPE OF SECOND REGISTER FROM 16 BITS TO 32 BITS.
   :
0 0 0 0 ............... NO FURTHER DIFFERENCE CODE
```

| LINE NUMBER | | PROGRAM CODE | |
|---|---|---|---|
| 0020 | | add | eax, edx |
| 0021 | | shl | edx, 1 |
| 0022 | | test | ecx, 1 |
| 0023 | | jnz | @f |
| 0024 | | add | eax, edx |
| 0025 | @@: | imul | ecx, edx |
| 0026 | | shl | ecx, 1 |
| 0027 | | mov | edx, 0 |
| 0028 | | idiv | ecx |

(B)

| LINE NUMBER | | PROGRAM CODE | |
|---|---|---|---|
| 0020 | | add | ax, dx |
| 0021 | | shl | dx, 1 |
| 0022 | | test | cx, 1 |
| 0023 | | jnz | @f |
| 0024 | | add | ax, dx |
| 0025 | @@: | push | ax |
| 0026 | | mov | ax, cx |
| 0027 | | imul | dx |
| 0028 | | mov | cx, ax |
| 0029 | | shl | cx, 1 |
| 0030 | | pop | ax |
| 0031 | | mov | dx, 0 |
| 0032 | | idiv | cx |

(C)

0020 ······ START LINE NUMBER FROM WHICH BASIC MODULE IS CHANGED
0028 ······ LAST LINE NUMBER TO WHICH BASIC MODULE IS CHANGED
01 ········ CHANGING TYPES OF ALL REGISTERS FROM 32 BITS TO 16 BITS.
· · · · · · ·

FIG.15

| CREATED LINE NUMBER | BASIC LINE NUMBER | DIFFERENCE CODE | | DESCRIPTION OF DIFFERENCE CODE |
|---|---|---|---|---|
| 0120 | 0020 | 01 | | CHANGING TYPES OF ALL REGISTERS FROM 32 BITS TO 16 BITS. |
| 0121 | 0021 | 01 | | CHANGING TYPES OF ALL REGISTERS FROM 32 BITS TO 16 BITS. |
| 0122 | 0022 | 01 | | CHANGING TYPES OF ALL REGISTERS FROM 32 BITS TO 16 BITS. |
| 0123 | 0023 | 01 | | CHANGING TYPES OF ALL REGISTERS FROM 32 BITS TO 16 BITS. |
| 0124 | 0024 | 01 | | CHANGING TYPES OF ALL REGISTERS FROM 32 BITS TO 16 BITS. |
| 0125 | 0025 | 0C | "push ax" | INSERTING PROGRAM CODE PRECEDED BY DIFFERENCE CODE BETWEEN PRECEDING LINE AND EXISTING LINE. |
| 0126 | 0025 | 0C | "mov ax, cx" | INSERTING PROGRAM CODE PRECEDED BY DIFFERENCE CODE BETWEEN PRECEDING LINE AND EXISTING LINE. |
| 0127 | 0025 | 07 | "dx" | SUBSTITUTING OPERAND WITH OPERAND PRECEDED BY DIFFERENCE CODE. |
| 0128 | 0026 | 0C | "mov cx, ax" | INSERTING PROGRAM CODE PRECEDED BY DIFFERENCE CODE BETWEEN PRECEDING LINE AND EXISTING LINE. |
| 0129 | 0026 | 01 | | CHANGING TYPES OF ALL REGISTERS FROM 32 BITS TO 16 BITS. |
| 0130 | 0027 | 0C | "pop ax" | INSERTING PROGRAM CODE PRECEDED BY DIFFERENCE CODE BETWEEN PRECEDING LINE AND EXISTING LINE. |
| 0131 | 0027 | 01 | | CHANGING TYPES OF ALL REGISTERS FROM 32 BITS TO 16 BITS. |
| 0132 | 0028 | 01 | | CHANGING TYPES OF ALL REGISTERS FROM 32 BITS TO 16 BITS. |

FIG.16

| LINE NUMBER | PROGRAM CODE | |
|---|---|---|
| 0020 | mov | eax, COS5 |
| 0021 | movsx | ebx, sword ptr C6 |
| 0022 | imul | ebx |
| 0023 | mov | ecx, eax |
| 0024 | mov | eax, SIN5 |
| 0025 | movsx | ebx, sword ptr C5 |
| 0026 | imul | ebx |
| 0027 | add | eax, ecx |
| 0028 | mov | cl, 9 |
| 0029 | sar | eax, cl |
| 0030 | mov | [edi+5*8*2], ax |

(B)

| LINE NUMBER | PROGRAM CODE | |
|---|---|---|
| 0020 | mov | ax, COS5 |
| 0021 | movsx | bx, sword ptr C6 |
| 0022 | imul | bx |
| 0023 | mov | cx, ax |
| 0024 | mov | ax, SIN5 |
| 0025 | mov | bx, sword ptr C5 |
| 0026 | imul | bx |
| 0027 | add | ax, cx |
| 0028 | mov | cl, 9 |
| 0029 | shr | ax, cl |
| 0030 | neg | cl |
| 0031 | add | cl, 16 |
| 0032 | shr | dx, cl |
| 0033 | or | ax, dx |
| 0034 | mov | [di+5*8*2], ax |

(C)

0020 ------ START LINE NUMBER FROM WHICH BASIC MODULE IS CHANGED

0030 ------ LAST LINE NUMBER TO WHICH BASIC MODULE IS CHANGED

03 ------ CHANGING TYPE OF FIRST REGISTER FROM 32 BITS TO 16 BITS

. . . . . . .

F I G. 17

| CREATED LINE NUMBER | BASIC LINE NUMBER | DIFFERENCE CODE | DESCRIPTION OF DIFFERENCE CODE |
|---|---|---|---|
| 0020 | 0020 | 03 | CHANGING TYPE OF FIRST REGISTER FROM 32 BITS TO 16 BITS. |
| 0021 | 0021 | 03 | CHANGING TYPE OF FIRST REGISTER FROM 32 BITS TO 16 BITS. |
| 0022 | 0022 | 01 | CHANGING TYPES OF ALL REGISTERS FROM 32 BITS TO 16 BITS. |
| 0023 | 0023 | 01 | CHANGING TYPES OF ALL REGISTERS FROM 32 BITS TO 16 BITS. |
| 0024 | 0024 | 03 | CHANGING TYPE OF FIRST REGISTER FROM 32 BITS TO 16 BITS. |
| 0025 | 0025 | 03 | CHANGING TYPE OF FIRST REGISTER FROM 32 BITS TO 16 BITS. |
| 0026 | 0026 | 01 | CHANGING TYPES OF ALL REGISTERS FROM 32 BITS TO 16 BITS. |
| 0027 | 0027 | 01 | CHANGING TYPES OF ALL REGISTERS FROM 32 BITS TO 16 BITS. |
| 0028 | 0028 | 00 | NO CHANGE. |
| 0029 | 0029 | 0B "shr ax, cl" | SUBSTITUTING EXISTING LINE WITH PROGRAM CODE PRECEDED BY DIFFERENCE CODE. |
| 0030 | 0030 | 0D 02, "reg cl", "add cl, 16" | INSERTING PROGRAM CODE PRECEDED BY DIFFERENCE CODE BETWEEN PRECEDING LINE AND EXISTING LINE. |
| 0032 | 0030 | 0C "shr dx, cl" | INSERTING PROGRAM CODE PRECEDED BY DIFFERENCE CODE BETWEEN PRECEDING LINE AND EXISTING LINE. |
| 0033 | 0030 | 0C "or  x, dx" | INSERTING PROGRAM CODE PRECEDED BY DIFFERENCE CODE BETWEEN PRECEDING LINE AND EXISTING LINE. |
| 0034 | 0030 | 03 | CHANGING TYPE OF FIRST REGISTER FROM 32 BITS TO 16 BITS. |

```
0020            mov        edx, [esi]
0021            mov        ecx, [edi]
0022            add        dx, cx
0023            cmp        dx, 255
0024            jb         @F
0025                       mov    dx,    255
0026            jmp        L01
0027    @@:     cmp        dx, 0
0028            ja         L01
0029                       mov dx, 0
0030    L01:    rol        edx, 16
0031            rol        ecx, 16
0032            add        dx, cx
```

(B)

```
0020            mov        dx, [si]
0021            mov        cx, [di]
0022            add        dx, cx
0023            cmp        dx, 255
0024            jb         @F
0025                       mov    dx,    255
0026            jmp        L01
0027    @@:     cmp        dx, 0
0028            ja         L01
0029                       mov dx, 0
0030    L01:    mov        [si], dX
0031            mov        dx, [si+2]
0032            mov        cx, [di+2]
0033            add        dx, cx
```

(C)

0020 ----- START LINE NUMBER FROM WHICH BASIC MODULE IS CHANGED
0032 ----- LAST LINE NUMBER TO WHICH BASIC MODULE IS CHANGED
01   ----- CHANGING TYPE OF REGISTER FROM 32 BITS TO 16 BITS
01   ----- CHANGING TYPE OF REGISTER FROM 32 BITS TO 16 BITS
  . . . . . .

FIG. 19

| CREATED LINE NUMBER | BASIC LINE NUMBER | DIFFERENCE CODE | DESCRIPTION OF DIFFERENCE CODE |
|---|---|---|---|
| 0020 | 0020 | 01 | CHANGING TYPES OF ALL REGISTERS FROM 32 BITS TO 16 BITS |
| 0021 | 0021 | 01 | CHANGING TYPES OF ALL REGISTERS FROM 32 BITS TO 16 BITS |
| 0022 | 0022 | 00 | NO CHANGE. |
| 0023 | 0023 | 00 | NO CHANGE. |
| 0024 | 0024 | 00 | NO CHANGE. |
| 0025 | 0025 | 00 | NO CHANGE. |
| 0026 | 0026 | 00 | NO CHANGE. |
| 0027 | 0027 | 00 | NO CHANGE. |
| 0028 | 0028 | 00 | NO CHANGE. |
| 0029 | 0029 | 00 | NO CHANGE. |
| 0030 | 0030 | 0C "mov [si], dx" | INSERTING PROGRAM CODE PRECEDED BY DIFFERENCE CODE BETWEEN PRECEDING LINE AND EXISTING LINE. |
| 0031 | 0030 | 0B "mov dx, [si+2]" | SUBSTITUTING EXISTING LINE WITH PROGRAM CODE PRECEDED BY DIFFERENCE CODE. |
| 0032 | 0031 | 0B "mov cx, [di+2]" | SUBSTITUTING EXISTING LINE WITH PROGRAM CODE PRECEDED BY DIFFERENCE CODE. |
| 0033 | 0032 | 00 | NO CHANGE. |

FIG. 20

(A)
```
0020         mov      ebx, r
0021         imul     ebx, YxRCoeff
0022         mov      eax, g
0023         imul     YxGCoeff
0024         add      ebx, eax
0025         mov      eax, b
0026         imul     YxBCoeff
0027         add      ebx, eax
0028         add      ebx, 128
0029         shr      ebx, 8
0030         cmp      ebx, 255
0031         jna      @F
0032                  mov      ebx, 255
0033   @@:  mov      [edi], bl
```

(B)
```
0020         mov      bx, r
0021         imul     bx, YxRCoeff
0022         mov      ax, g
0023         imul     YxGCoeff
0024         add      bx, ax
0025         mov      ax, b
0026         imul     YxBCoeff
0027         add      bx, ax
0028         adc      dx, 0
0029         add      bx, 128
0030         adc      dx, 0
0031         shr      bx, 8
0032         mov      bh, dl
0033         cmp      bx, 255
0034         jna      @F
0035                  mov      bx, 255
0036   @@:  mov      [di], bl
```

(C)
0020 ---- START LINE NUMBER OF WHICH BASIC MODULE IS CHANGED
0033 --- LAST LINE NUMBER OF WHICH BASIC MODULE IS CHANGED
03 ------ CHANGING TYPE FROM FIRST REGISTER FROM 32 BITS TO 16 BITS
03 ------ CHANGING TYPE TO FIRST REGISTER FROM 32 BITS TO 16 BITS.
. . . . . .

F I G. 21

| CREATED LINE NUMBER | BASIC LINE NUMBER | DIFFERENCE CODE | DESCRIPTION OF DIFFERENCE CODE |
|---|---|---|---|
| 0020 | 0020 | 03 | CHANGING TYPE OF FIRST REGISTER FROM 32 BITS TO 16 BITS. |
| 0021 | 0021 | 03 | CHANGING TYPE OF FIRST REGISTER FROM 32 BITS TO 16 BIT. |
| 0022 | 0022 | 03 | CHANGING TYPE OF FIRST REGISTER FROM 32 BITS TO 16 BITS |
| 0023 | 0023 | 00 | NO CHANGE. |
| 0024 | 0024 | 01 | CHANGING TYPES OF ALL REGISTERS FROM 32 BITS TO 16 BITS. |
| 0025 | 0025 | 03 | CHANGING TYPE OF FIRST REGISTER FROM 32 BITS TO 16 BITS. |
| 0026 | 0026 | 00 | NO CHANGE. |
| 0027 | 0027 | 01 | CHANGING TYPES OF ALL REGISTERS FROM 32 BITS TO 16 BITS. |
| 0028 | 0028 | 0C " adc dx, 0 " | { INSERTING PROGRAM CODE PRECEDED BY DIFFERENCE CODE BETWEEN PRECEDING LINE AND EXISTING LINE. |
| 0029 | 0028 | 03 | CHANGING TYPE OF FIRST REGISTER FROM 32 BITS TO 16 BITS. |
| 0030 | 0029 | 0C " adc dx, 0 " | { INSERTING PROGRAM CODE PRECEDED BY DIFFERENCE CODE BETWEEN PRECEDING LINE AND EXISTING LINE. |
| 0031 | 0029 | 03 | CHANGING TYPE OF FIRST REGISTER FROM 32 BITS TO 16 BITS. |
| 0032 | 0030 | 0C " mov bh, dl " | { INSERTING PROGRAM CODE PRECEDED BY DIFFERENCE CODE BETWEEN PRECEDING LINE AND EXISTING LINE. |
| 0033 | 0030 | 03 | CHANGING TYPE OF FIRST REGISTER FROM 32 BITS TO 16 BITS. |
| 0034 | 0031 | 00 | NO CHANGE. |
| 0035 | 0032 | 03 | CHANGING TYPE OF FIRST REGISTER FROM 32 BITS TO 16 BITS. |
| 0036 | 0033 | 03 | CHANGING TYPE OF FIRST REGISTER FROM 32 BITS TO 16 BITS. |

FIG. 22

(A)
```
0020      bswap     edx
0021      mov       [edi], ebx
0022      add       edi, 4
```

(B)
```
0020      xchg      bh, bl
0021      xchg      dh, dl
0022      mov       [di], bx
0023      mov       [di+2], dx
0024      add       di, 4
```

(C)
```
0020 ----------- START LINE NUMBER FROM WHICH BASIC MODULE IS CHANGED
0022 ----------- LAST LINE NUMBER TO WHICH BASIC MODULE IS CHANGED
0C" xchg bh, bl " ⎫ INSERTING PROGRAM CODE PRECEDED BY DIFFERENCE CODE
                  ⎩ BETWEEN PRECEDING LINE AND EXISTING CODE.
0A" xchg dh, dl " ⎧ SUBSTITUTING EXISTING LINE WITH PROGRAM CODE PRECEDED BY
                  ⎩ DIFFERENCE CODE.
. . . . . .
```

FIG. 23

| CREATED LINE NUMBER | BASIC LINE NUMBER | DIFFERENCE CODE | | DESCRIPTION OF DIFFERENCE CODE |
|---|---|---|---|---|
| 0020 | 0020 | 0C | "xchg bh, bl" | INSERTING PROGRAM CODE PRECEDED BY DIFFERENCE CODE BETWEEN PRECEDING LINE AND EXISTING LINE. |
| 0021 | 0020 | 0A | "xchg dh, dl" | SUBSTITUTING EXISTING LINE WITH PROGRAM CODE PRECEDED BY DIFFERENCE CODE. |
| 0022 | 0021 | 01 | | CHANGING TYPES OF ALL REGISTERS FROM 32 BITS TO 16 BITS. |
| 0023 | 0022 | 0C | "mov [di+2], dx" | INSERTING PROGRAM CODE PRECEDED BY DIFFERENCE CODE BETWEEN PRECEDING LINE AND EXISTING LINE. |
| 0024 | 0022 | 03 | | CHANGING TYPE OF FIRST REGISTER FROM 32 BITS TO 16 BITS. |

FIG. 24
PRIOR ART
1 OR MORE GOP(s)
VIDEO SEQUENCE
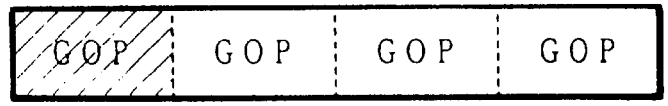
1 OR MORE PICTURE(S)
GOP (Group Of Picture)
1 OR MORE SLICE(S)
PICTURE
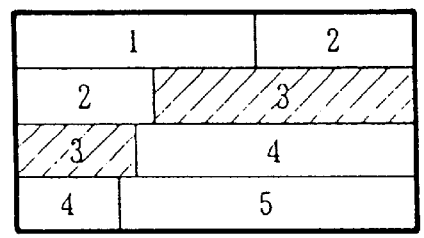
1 OR MORE MACRO BLOCK(S)
SLICE
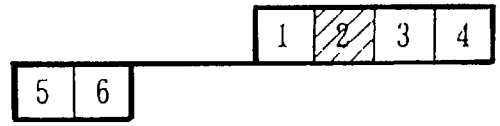
6 BLOCKS
MACRO BLOCK
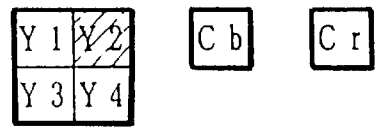
LUMINANCE COMPONENTS      COLOR DIFFERENCE COMPONENTS
(8 X 8) PIXELS
BLOCK

MODULE SWITCHING TYPE PICTURE COMPRESSING AND REPRODUCING APPARATUS

BACKGROUND OF THE INVENTION

1. Field of the Invention

The present invention relates to a picture processing apparatus, in particular, to an apparatus for compressing and encoding picture data with a CPU (Central Processing Unit) or a DSP (Digital Signal Processor) and an apparatus for reproducing picture data from compressed picture code with a CPU or a DSP.

2. Description of the Related Art

If digitized picture data are directly recorded in a record medium such as a CD-ROM and a hard disk, required capacity of record media becomes huge. Thus, the digitized picture data are normally compressed before recorded. DCT (Discrete Cosine Transform) coding has been more widely used in compression systems than other method such as DPCM and other orthogonal transform codings. For example, DCT coding is used in international encoding standards such as JPEG (Joint Photographic coding Experts Group) and MPEG (Moving Picture coding Experts Group). DCT coding utilizes its characteristics that power spectrum concentrates in lower frequency components of DCT coefficients.

FIG. 24 is a schematic diagram showing hierarchical levels of a coding format corresponding to MPEG. Referring to FIG. 24, MPEG codes are hierarchically structured. The top hierarchical level is a video sequence. The video sequence is composed of a plurality of GOPs (Group Of Pictures). Each GOP is composed of a plurality of pictures. One picture represents one frame. Pictures can be categorized into I pictures, P pictures, and B pictures. I pictures are intra-frame encoded. P pictures are forward inter-frame encoded. B pictures are forward/backward inter-frame encoded. Each picture is composed of a plurality of slices. Each slice is composed of a plurality of macro blocks that are arranged from left to right and from top to bottom. Each macro block is composed of a total of six blocks. Four blocks of them are luminance components (Y1, Y2, Y3, and Y4) and two blocks of them are color difference components (Cb and Cr). Each of blocks is composed of 8×8 pixels. Each block is the minimum coding unit.

Next, with reference to the accompanying drawings, a picture compressing system corresponding to a conventional DCT system such as MPEG will be described.

FIG. 25 is a block diagram showing a structure of a picture compressing apparatus that compresses picture data corresponding to MPEG. Referring to FIG. 25, the picture compressing apparatus reads RGB pixel data of the picture. YUV converting means 205 converts the RGB pixel data into YUV pixel data. Motion estimating means 206 searches the motion of macro blocks of the present frame relative to preceding/following frames. As mentioned above, pictures are categorized into three types of pictures: I pictures which are intra-frame encoded, P pictures which are interframe encoded, and pictures which are forward/backward interframe encoded. Thus, three types of compressing processes are performed.

In the case of I pictures, DCT means 208 transforms block data in the present frame to DCT coefficients. A quantizing means 209 quantizes the DCT coefficients. A variable length encoding means 210 compresses with high-efficiency the quantized DCT coefficients to Huffman codes.

Reproduced picture data used as reference in encoding P pictures and B pictures are obtained from quantized DCT coefficients as follows. Dequantizing means 214 dequantizes the quantized DCT coefficients. IDCT (Inverse Discrete Cosine Transform) means 213 performs the inverse discrete cosine transform for the dequantized DCT coefficients. The obtained picture data are stored in reference frame portion 211.

In the case of P pictures, motion-compensated predicting means 207 calculates the differences between the level of the pixels of each blocks in the present frame and the level of the pixels in the preceding frame read out from the reference frame portion 211 with the displacement pointed out by a motion vector searched by the motion estimating means 206. The DCT means 208 performs the discrete cosine transform for the differential data to produce DCT coefficients. The quantizing means 209 quantizes the DCT coefficients. The variable length encoding means 210 compresses with high-efficiency the quantized DCT coefficients to Huffman codes.

Reproduced picture data used as reference in encoding other P pictures and B pictures are obtained from quantized DCT coefficients as follows. Dequantizing means 214 dequantizes the quantized DCT coefficients. IDCT (Inverse Discrete Cosine Transform) means 213 performs the inverse discrete cosine transform for the dequantized DCT coefficients to generate differential data. The picture data in reference frame portion 211 are read out with the displacement pointed out by motion vector and added to the differential data. The sums are stored in reference frame portion 211.

In the case of B pictures, the motion-compensated predicting means 207 calculates the differential data between the level of the pixels of the block in the present frame and the level of the pixels in the preceding or following frame read out from the reference frame portion 211 with the displacement pointed out by a motion vector searched by the motion estimating means 206. The DCT means 208 performs the discrete cosine transform for the differential data to generate DCT coefficients. The quantizing means 209 quantizes the DCT coefficients. The variable length encoding means 210 compresses with high-efficiency the quantized DCT coefficients to Huffman codes. Since B pictures are not used as a reference frame, reproduced picture data are not regenerated from the quantized DCT coefficients in B pictures.

Next, with the reference to the accompanying drawings, a picture data reproducing system will be described. FIG. 26 is a block diagram showing the structure of a picture reproducing apparatus that reproduces picture data from the codes which are generated by picture compressing system or conform to MPEG syntax.

The picture data reproducing apparatus shown in FIG. 26 decodes I pictures that have been intra-frame encoded, P pictures that have been forward inter-frame encoded, and B pictures that have been forward or backward inter-frame encoded.

In the case of I pictures, picture data are reproduced as follows. The variable length decoding means 225 decodes variable length codes to regenerate quantized DCT coefficients. The dequantizing means 226 dequantizes the quantized DCT coefficients to regenerate dequantized DCT coefficients. The IDCT means 227 performs the inverse discrete cosine transform for the dequantized DCT coefficients to regenerate the YUV pixel data. RGB converting means 228 converts YUV pixel data into RGB pixel data and outputs the RGB pixel data.

In the case of P pictures, picture data are reproduced as follows. The variable length decoding means 225 decodes variable length codes to regenerate quantized DCT coefficients. The dequantizing means 226 dequantizes the quantized DCT coefficients. The IDCT means 227 performs the inverse discrete cosine transform to regenerate the differential data. The data of preceding frame read out from the reference frame portion 229 are compensated in motion by the motion compensating means 230 and added to the differential data to regenerate data in the present frame. The RGB converting means 228 converts the resultant data into RGB pixel data and outputs the RGB pixel data.

In the case of B pictures, picture data are reproduced as follows. The variable length decoding means 225 decodes variable length codes to regenerate quantized DCT coefficients. The dequantizing means 226 dequantizes the quantized DCT coefficients. The IDCT means 227 performs the inverse discrete cosine transform to regenerate the differential data. The data of preceding frame or following frame read out from the reference frame portion 229 are compensated in motion by the motion compensating means 230 and added to the differential data to regenerate data in the present frame. The RGB converting means 228 converts the resultant data into RGB pixel data and outputs the RGB pixel data.

Thus, corresponding to the international standard MPEG system, a picture data can be compressed with high-efficiency and reproduced. However, since the motion estimating, motion-compensated predicting process and the DCT/IDCT process require a large number of calculations, when a picture data are compressed and reproduced by software on CPU or DSP, it should be processed with an optimum program corresponding to the characteristic of each of CPUs, DSPs.

Thus, a variety of programs corresponding to a variety of CPUs, DSPs should be provided and they should be switched to cope with each of CPUs and DSPs.

As a related art reference for switching a plurality of programs, a system which switches a plurality of encoding/decoding processes on a time sharing basis with a priority has been proposed in Japanese Patent Laid-Open Publication 63-234,461. In addition, for example, in Japanese Patent Laid-Open Publication No. 2-108119, a structure of which a plurality of data compressing means are provided and data are compressed by the optimum means with the most compression efficiency is disclosed. In Japanese Patent Laid-Open Publication No. 5-233267, a structure of a program ROM built-in apparatus of which both a compressed program stored in a ROM and a differential program stored in a backup RAM are both developed in a RAM to compose a executable program has been proposed.

However, in the conventional picture compressing and reproducing apparatuses, a large number of programs corresponding to a large number of CPUs, DSPs, and so forth are required. Thus, the storage capacity of programs becomes large.

In addition, whenever apparatuses are switched, programs must also be switched. Thus, the process becomes complicated.

SUMMARY OF THE INVENTION

An object of the present invention is to provide a picture compressing apparatus and reproducing apparatus which execute an optimum program for the CPU or DSP in use among a large number of types of CPUs and DSPs and are provided with a small program capacity.

A first aspect of the present invention is to provide a picture compressing apparatus which compresses picture data by causing a facultative CPU (Central Processing Unit) or a facultative DSP (Digital Signal Processor) to execute a program for performing an intra-frame encoding process, a forward inter-frame encoding process and a bidirectional inter-frame encoding process, wherein said intra-frame encoding process comprises dividing the present frame into small blocks, performing DCT (Discrete Cosine Transform) process for each of the small blocks, quantizing the transformed result, and encoding with high-efficiency the quantized result, said forward inter-frame encoding process comprises dividing the present frame into small blocks, searching through the preceding frame for a small block which minimizes the difference between each of the small blocks in the present frame and the searched small block, obtaining the differential data between each of the small blocks in the present frame and the relevant searched small block, performing the DCT process for the differential data, quantizing the transformed result, and encoding with high-efficiency the quantized result, said bidirectional inter-frame encoding process comprises dividing the present frame into small blocks, searching through the preceding frame and the following frame for a small block which minimizes the difference between each of the small blocks in the present frame and the searched small block, obtaining the differential data between each of the small blocks in the present frame and the relevant searched small block, performing the DCT process for the differential data, quantizing the transformed result, and encoding with high-efficiency the quantized result, said program is composed of a basic module and differential modules of which each corresponds to each CPU and each DSP, the apparatus comprises a means for storing the modules, a means for detecting the CPU or DSP which is being currently used, and a means for creating the program for the detected CPU or DSP with the basic module and the differential module corresponding to the CPU or DSP.

A second aspect of the present invention is to provide a picture reproducing apparatus which reproduces picture data by causing a facultative CPU (Central Processing Unit) or a facultative DSP (Digital Signal Processor) to execute a program for performing a reproducing process, wherein said reproducing process comprises decoding picture codes to regenerate quantized DCT coefficients, dequantizing the quantized DCT coefficients to regenerate dequantized DCT coefficients, performing IDCT (Inverse Discrete Cosine Transform) for the dequantized DCT coefficients to regenerate pixel data or differential data, storing the regenerated pixel data in a reference frame portion, reading out pixel data from the reference frame portion, compensating the motion of the read pixel data, adding the differential data to the motion compensated pixel data, said program is composed of a basic module and differential modules of which each corresponds to each CPU and each DSP, the apparatus comprises a means for storing the modules, a means for detecting the CPU or DSP which is being currently used, and a means for creating the program for the detected CPU or DSP with the basic module and the differential module corresponding to the CPU or DSP.

These and other objects, features and advantages of the present invention will become more apparent in light of the following detailed description of the best mode embodiment thereof, as illustrated in the accompanying drawings.

BRIEF DESCRIPTION OF DRAWINGS

FIG. 6 is a second part of a flow chart for explaining a picture compressing process according to an embodiment of the present invention;

FIG. 7 is a flow chart for explaining a compression program creating process according to an embodiment of the present invention;

FIG. 8 is a flow chart for explaining an apparatus controlling means of a picture reproducing apparatus according to an embodiment of the present invention;

FIG. 9 is a flow chart for explaining a picture reproducing process according to an embodiment of the present invention;

FIG. 12($a$) is an example of instruction;

FIG. 12($b$) is a list showing difference codes according to an embodiment of the present invention;

FIG. 13($c$) is an example of a string of difference codes;

FIG. 14(A) is a list of program codes of a basic quantizing module;

FIG. 14(B) is a list of program codes of an optimum quantizing module for CPU B;

FIG. 14($c$) is a top portion of a list of difference codes of a quantizing differential module for CPU B;

FIG. 15 is a list of difference codes of a quantizing differential module for CPU B;

FIG. 16(A) is a list of program codes of a basic DCT module;

FIG. 16(B) is a list of program codes of an optimum DCT module for CPU B;

FIG. 16($c$) is a top portion of a list of difference codes of a DCT differential module for CPU B;

FIG. 17 is a list of difference codes of a DCT differential module for CPU B;

FIG. 18(A) is a list of program codes of a basic motion compensating module;

FIG. 18(B) is a list of program codes of an optimum motion compensating module for CPU B;

FIG. 18($c$) is a top portion of a list of difference codes of a motion compensating differential module for CPU B;

FIG. 19 is a list of difference codes of a motion compensating differential module for CPU B;

FIG. 20(A) is a list of program codes of a basic YUV converting module;

FIG. 20(B) is a list of program codes of an optimum YUV converting module for CPU B;

FIG. 20($c$) is a top portion of a list of difference codes of a YUV converting differential module for CPU B;

FIG. 21 is a list of difference codes of a YUV converting differential module for CPU B;

FIG. 22(A) is a list of program codes of a basic variable length encoding module;

FIG. 22(B) is a list of program codes of an optimum variable length encoding module for CPU B;

FIG. 22($c$) is a top portion of a list of difference codes of a variable length encoding differential module for CPU B;

FIG. 23 is a list of difference codes of a variable length encoding differential module for CPU B;

FIG. 24 is a schematic diagram showing hierarchical levels of a code format conforming to MPEG;

DESCRIPTION OF PREFERRED EMBODIMENTS

Figure 1:
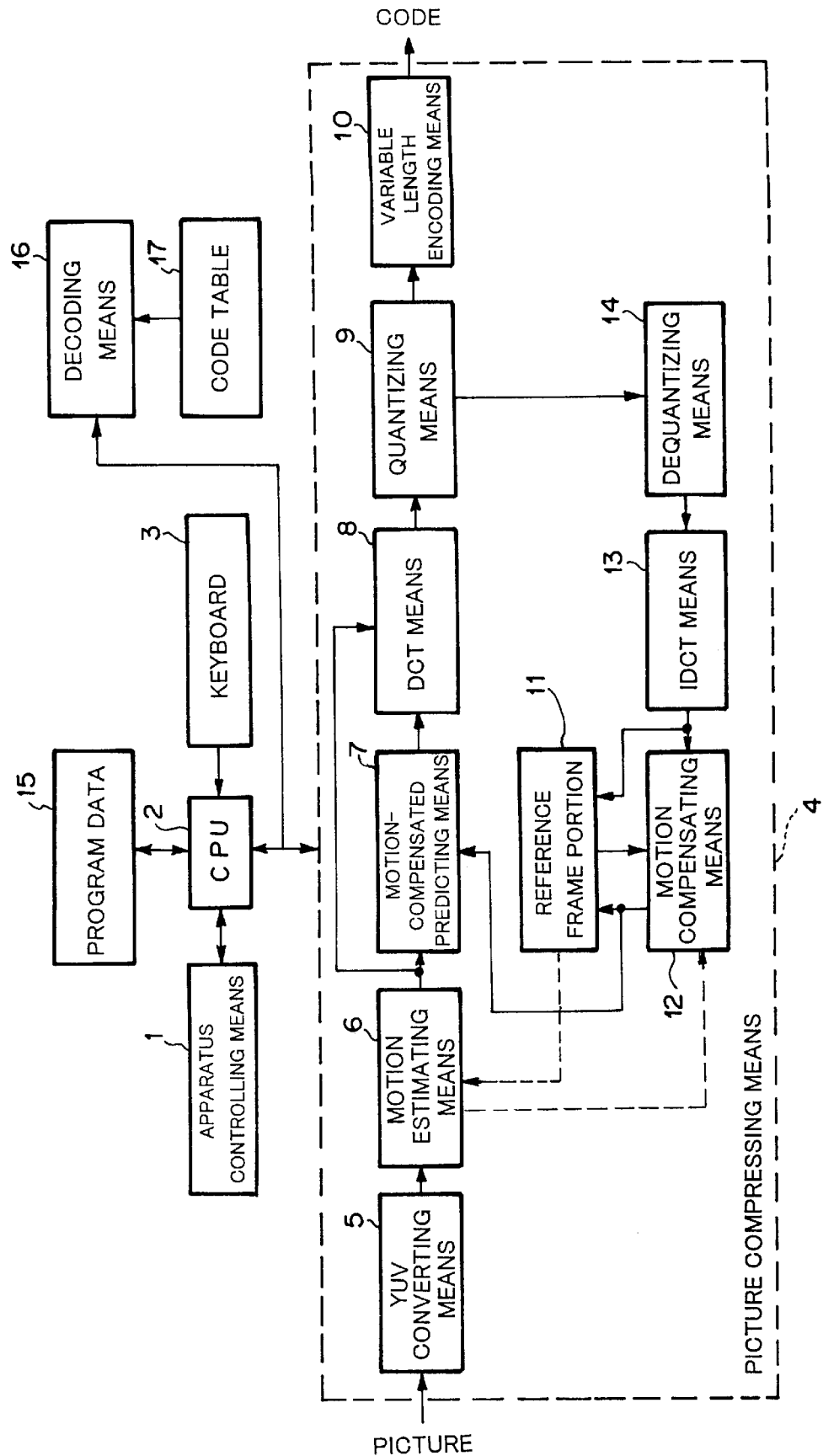
FIG. 1 is a block diagram showing an example of the structure of a picture compressing apparatus according to an embodiment of the present invention.

FIG. 1 is a block diagram showing the structure of a picture compressing apparatus according to an embodiment of the present invention. With reference to FIG. 1, the picture compressing apparatus comprises apparatus controlling means 1, CPU 2, keyboard 3, picture compressing means 4, program data 15, decoding means 16, and code table 17. The apparatus controlling means 1 controls the entire apparatus. The CPU 2 executes a program which is equivalent to picture compressing means 4. The keyboard 3 allows the user to input data to the apparatus. The picture compressing means 4 compresses a picture. The program data 15 contains the basic modules and plural sets of differential modules. Each of differential modules is generated by taking difference between the basic module and an optimum module for each of CPU. All of the modules are compressed by entropy coding. The decoding means 16 decodes the program data 15 with reference to code table 17 in which entropy codes are stored.

The picture compressing means 4 comprises YUV converting means 5, motion estimating means 6, motion-compensated predicting means 7, DCT means 8, quantizing means 9, variable length encoding means 10, dequantizing means 14, IDCT means 13, motion compensating means 12, and reference frame portion 11.

The YUV converting means 5 converts RGB pixel data of a picture into YUV pixel data. The motion estimating means 6 searchers the motion of the picture for each of macro blocks. The motion-compensated predicting means 7 calculates the differential data between the existing block and the blocks of the preceding/following frames that have been motion compensated. The DCT means 48 performs the discrete cosine transform process for the absolute data or differential data of the block to generate DCT coefficients. The quantizing means 9 quantizes the DCT coefficients. The variable length encoding means 10 encodes the quantized DCT coefficients to Huffman codes. The dequantizing means 9 dequantizes the quantized DCT coefficients. The IDCT means 13 performs the IDCT process for the dequantized DCT coefficients to generate absolute pixel data or difference pixel data. The motion compensating means 12 adds the differential data to the absolute pixel data of the reference frame that has been motion compensated and write the sum to the reference frame portion 11. The reference frame portion 11 stores the preceding/following reference frames.

The picture compressing apparatus shown in FIG. 1 reads RGB pixel data of a picture. The YUV converting means 5 converts the RGB pixel data into YUV pixel data. The motion estimating means 6 searches the motion vector of each of the macro blocks in the present frame. The motion vector is derived so that difference between picture block in the present frame and a picture block in the preceding frame or following frame which is displaced according to the motion vector is minimized.

In MPFG, pictures (frames) are categorized into I pictures that are intra-frame encoded, P pictures that are forward inter-frame encoded, and B pictures that are forward/backward or bidirectionally inter-frame encoded. Thus, corresponding to the type of a picture, three types of compression are performed.

In the case of I pictures, a DCT means 8 performs the discrete cosine transform process for the data of the block of the existing frame to generate DCT coefficients. A quantizing means 9 quantizes the DCT coefficients. A variable length encoding means 10 compresses with high-efficiency the quantized DCT coefficients to Huffman codes.

Reproduced picture data used as reference in encoding P pictures and B pictures are obtained from quantized DCT coefficients as follows. Dequantizing means 14 dequantizes the quantized DCT coefficients. IDCT (Inverse Discrete Cosine Transform) means 13 performs the inverse discrete cosine transform process for the dequantized DCT coefficients to regenerate pixel data. The obtained pixel data are stored in a reference frame portion 11.

In the case of P pictures, a motion-compensated predicting means 7 calculates the differential data between the data of the pixels of the block (8×8 pixels) of the existing frame and the data of the pixels of the preceding frame read out from the reference frame portion 11 with the displacement assigned by a motion vector searched by the motion estimating means 8. The DCT means 8 performs the discrete cosine transform process for the differential data to generate DCT coefficients. The quantizing means 9 quantizes the DCT coefficients. The variable length encoding means 10 compresses with high-efficiency the quantized DCT coefficients to Huffman codes.

Reproduced picture data used as reference in encoding P pictures and B pictures is obtained from quantized DCT coefficients as follows. The dequantizing means 14 dequantizes the quantized DCT coefficients. The IDCT means 13 performs the inverse discrete cosine transform process for the dequantized DCT coefficients to regenerate differential data. The picture data in reference frame portion 11 are read out with the displacement pointed out by motion vector and added to the differential data. The sums are stored in reference frame portion 11.

In the case of B pictures, the motion-compensated predicting means 7 calculates the differential data between the data of the pixels of the block (8×8 pixels) of the existing frame and the data of the pixels of the preceding frame or following frame read out from the reference frame portion 11 with the displacement assigned by the motion vector searched by the motion estimating means 6. The DCT means 8 performs the discrete cosine transform process for the differential data to generate DCT coefficients. The quantizing means 9 quantizes the DCT coefficients. The variable length encoding means 10 compresses with high-efficiency the quantized DCT coefficients to Huffman codes. Since B pictures are not used as a reference frame, pixel data are riot regenerated from the quantized DCT coefficients in B pictures.

The apparatus controlling means 1 examines the ID of existing CPU 2 and CPU ID of the program data 15 to determine whether or not the program of the picture compressing means 4 is an optimum program for an existing CPU 2. When the determined result is No, the apparatus controlling means 1 extracts compressed codes of basic modules and differential modules corresponding to the existing CPU from the program data 15, causes the decoding means 16 to decode the compressed codes with reference to code table 17, combines decoded modules for each function to generate optimum modules for the existing CPU 2, and combines and assembles the optimum modules into the optimum program for the existing CPU 2.

Figure 2:
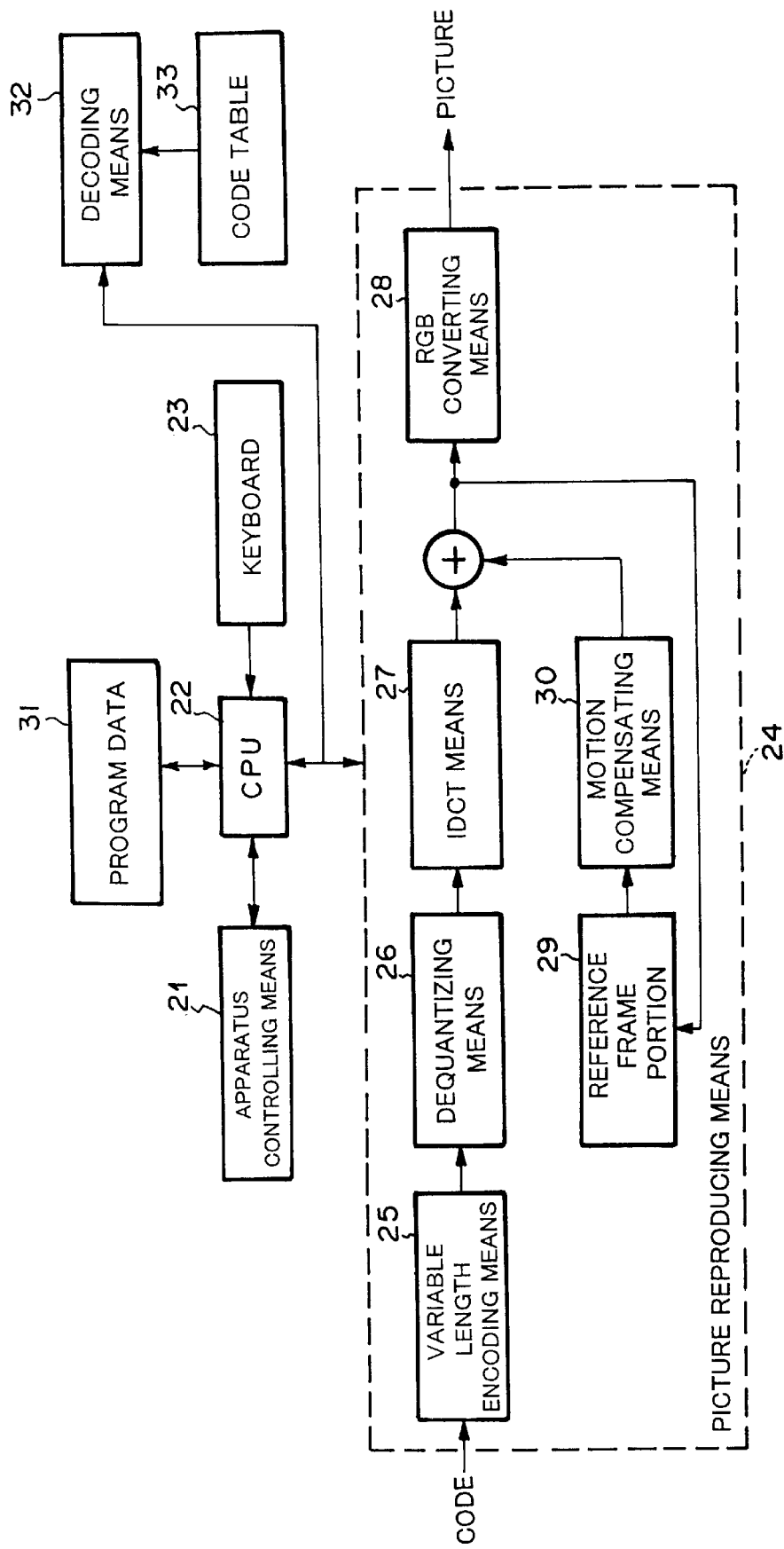
FIG. 2 is a block diagram showing an example of the structure of a picture reproducing apparatus according to an embodiment of the present invention.

FIG. 2 is a block diagram showing the structure of a picture reproducing apparatus according to an embodiment of the present invention.

With reference to FIG. 2, the picture reproducing apparatus comprises apparatus controlling means 21, CPU 22, keyboard 23, picture reproducing means 24, program data 31, decoding means 32, and code table 33. The apparatus controlling means 21 controls the entire apparatus. The CPU 22 executes the program which is equivalent to the picture reproducing means 24. The keyboard 23 allows the user to input data to the apparatus. The picture reproducing means 24 reproduces pictures. The program data 31 contains the basic modules and plural sets of differential modules. Each of differential modules is generated by taking difference between the basic module and an optimum module for each of CPU. All of the modules are compressed by entropy coding. The decoding means 32 decodes the program data 31. The decoding means 32 decodes the program data 31 with reference to code table 33 in which entropy codes are stored.

The picture reproducing means 24 comprises variable length decoding means 25, dequantizing means 26, IDCT means 27, RGB converting means 28, reference frame portion 29, and motion compensating means 30. The variable length decoding means 25 decodes compressed codes to regenerate quantized DCT coefficients. The dequantizing means 26 dequantizes the quantized DCT coefficients that have been decoded to regenerate dequantized DCT coefficients. The IDCT means 27 performs the inverse discrete cosine transform process for the dequantized DCT coefficients to regenerate YUV pixel data or differential data. The RGB converting means 28 converts YUV pixel data into RGB pixel data. The reference frame portion 69 stores the preceding frame and following frame which are used as reference frames. The motion compensating means 30 compensates the motion of the block data that are read out from the reference frame portion 69 corresponding to motion vectors.

The picture reproducing apparatus shown in FIG. 2 receives encoded with high-efficiency codes of the picture and reproduces pictures that are consist of I pictures that have been intra-frame encoded, P pictures that have been forward inter-frame encoded, and B pictures that have been forward or backward inter-frame encoded.

In the case of I pictures, picture data are reproduced as follows. The variable length decoding means 25 decodes the received codes to regenerate quantized DCT coefficients. The dequantizing means 26 dequantizes the quantized DCT coefficients to regenerate dequantized DCT coefficients. The IDCT means 27 performs the inverse discrete cosine transform process for the dequantized DCT coefficients to regenerate the YUV pixel data of the block. The RGB converting means 28 converts YUV pixel data into RGB pixel data.

In the case of P pictures, picture data are reproduced as follows. The variable length decoding means 25 decodes the received codes to regenerate quantized DCT coefficients. The dequantizing means 26 dequantizes the quantized DCT coefficients. The IDCT means 27 performs the inverse discrete cosine transform process for the dequantized DCT coefficients to generate the differential data of the pixels of the block. The data of preceding frame read out from the reference frame portion 29 are compensated in motion by the motion compensating means 30 and added to the differential data to regenerate YUV pixel data in the present frame. The RGB converting means 28 converts the resultant data into RGB pixel data and outputs the RGB pixel data.

In the case of B pictures, the variable length decoding means 25 decodes the received codes to regenerate quantized DCT coefficients. The dequantizing means 26 dequantizes the quantized DCT coefficients. The IDCT means 27 performs the inverse discrete cosine transform process for the dequantized DCT coefficients to regenerate the differential data of the block. The data of preceding or following frame read out from the reference frame portion 29 is motion compensated by the motion compensating means 30 and added to the differential data to regenerate YUV pixel data in the present frame. The RGB converting means 28 converts the resultant data into RGB pixel data and outputs the RGB pixel data.

In addition, the apparatus controlling means 21 examines the ID of existing CPU 22 and the CPU ID of the program data 31 to determines whether or not the program of the picture reproducing means 24 is an optimum program for the existing CPU 22. When the determined result is No, the apparatus controlling means 21 extracts compressed codes of basic modules and differential modules corresponding to the existing CPU from the program data 31, causes the decoding means 32 to decode the compressed codes with reference to code table 33, combines decoded modules for each function to generate optimum modules for the existing CPU 22, and combines and assembles the optimum modules into the optimum program for the existing CPU 22.

Next, the method of creating an optimum program for a particular CPU according to an embodiment of the present invention will be described.

Figure 3:
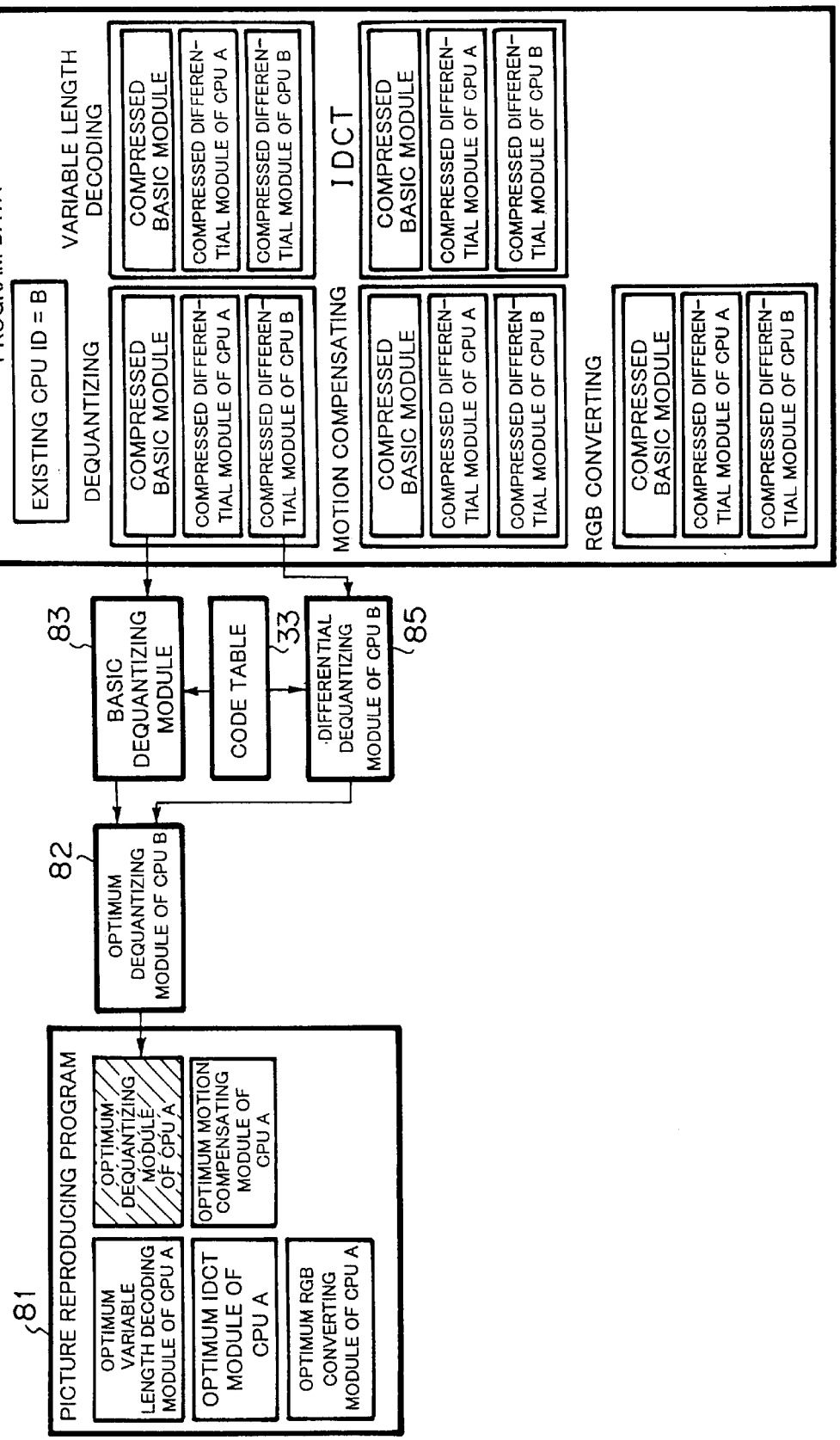
FIG. 3 is a schematic diagram for explaining a creating process of an optimum program according to an embodiment of the present invention.

FIG. 3 is a schematic diagram showing a data flow of an optimum program creating process according to an embodiment of the present invention. FIG. 3 shows how the dequantizing optimum module for CPU B 82 is generated from a compressed basic and differential module in program data 31 in the case that a CPU A (CPU ID=A) is switched to a CPU B (CPU ID=B).

At first, compressed codes of basic module of dequantizing and compressed codes of differential data of dequantizing corresponding to CPU B are extracted from the program data 31.

Next the decoding means 32 decodes the compressed codes of basic module to generate basic module of dequantizing 83 with reference to the code table 33, decodes the compressed codes of differential data to generate (differential module of dequantizing corresponding to CPU B 85 with reference to the code table 33, and creates dequantizing module 82 optimum for CPU B from the basic module 83 and the differential data 85.

Next, the dequantizing optimum module for the CPU A in the picture reproducing program 81 is substituted with the dequantizing module 82 optimum for the CPU B.

Next, likewise, the variable length decoding optimum module for CPU A, the IDCT optimum module for CPU A, the motion compensating optimum module for CPU A, and the RGB converting optimum module for CPU A are substituted with those optimum for CPU B. Thus, a picture reproducing program 81 optimum for CPU B is created.

The program data 31 is composed of modules that specially causes the CPU to be highly loaded. That is, on the picture reproducing side, the program data 31 is composed of a variable length decoding module, an dequantizing module, an IDCT module, a motion compensating module, and an RGB converting module. In addition, since the modules have many repetitive instructions, similar instructions are contained and arranged in modules. Thus, the difference between optimum modules for different CPUs is small and the amount of differential data is small.

According to an embodiment of the present invention, program data is so structured that the aforementioned feature of differential data is utilized. By making the program data 31 consist of the basic modules and the differential modules that are created by taking difference between each basic module and plurality of the optimum module for each CPU, the entire size of the program data 31 can be reduced.

On the picture compressing side, likewise, the program data 15 consist of basic modules and differential modules for each function such as YUV converting, motion estimating, motion-compensated predicting, DCT, quantization, variable length encoding, dequantization, IDCT, and motion compensation.

Next, the operation according to an embodiment of the present invention will be described.

Figure 4:
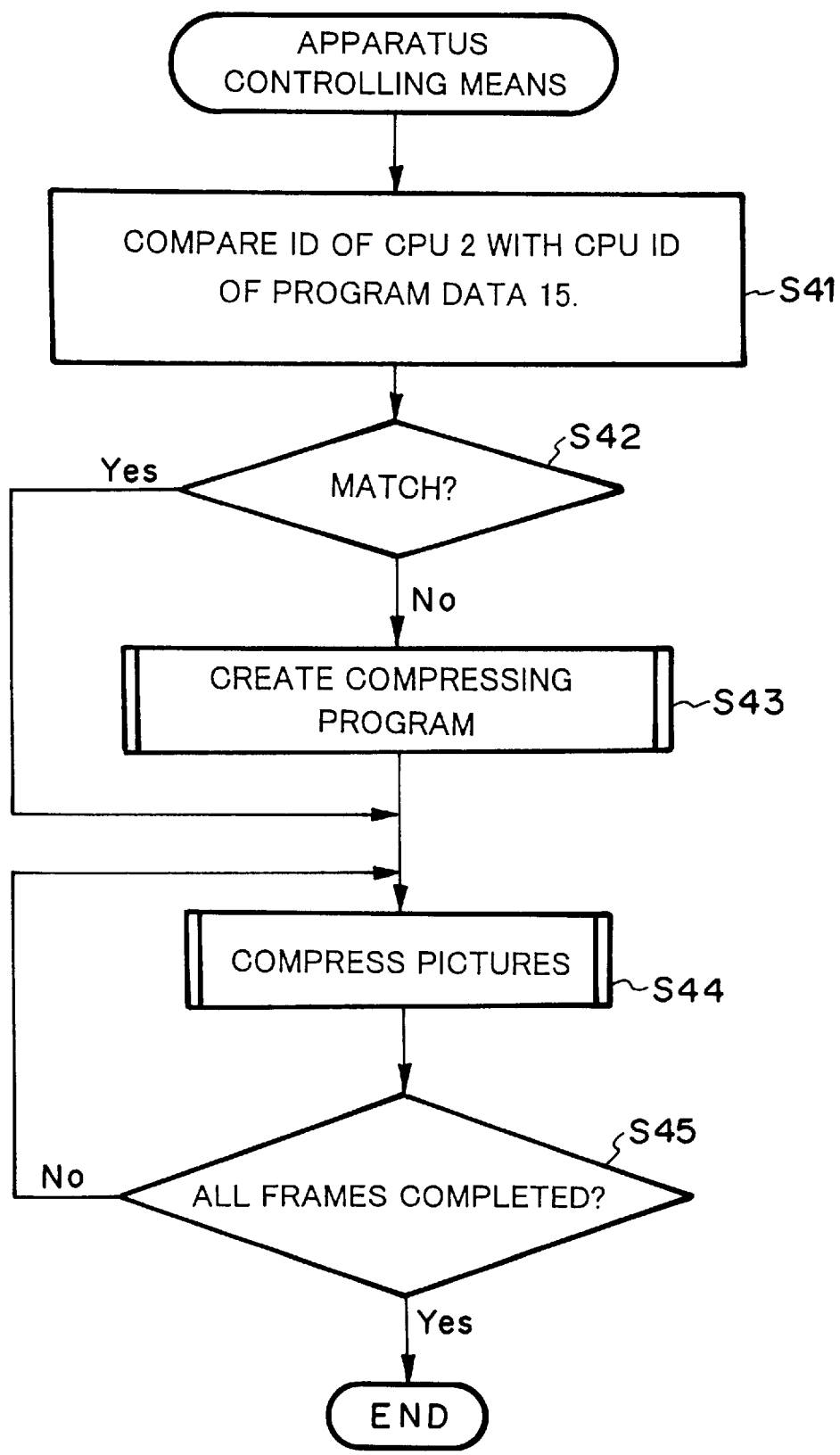
FIG. 4 is a flow chart for explaining a process of an apparatus controlling means of a picture compressing apparatus according to an embodiment of the present invention.

FIG. 4 is a flow chart showing a process of the apparatus controlling means 1 of the picture compressing apparatus shown in FIG. 1.

The system compares the ID of the existing CPU 2 and the CPU ID of the existing program data 15 (at step 41) and determines; whether or not they match (at step 42). Only if the determined result at step 42 is No, the system creates a compression program (at step 43). Next, the system compresses; pictures (at step 44). The system determines whether or not all frames have been compressed (at step 45). When the determined result at step 45 is No, the flow returns to step 44.

Figure 5:
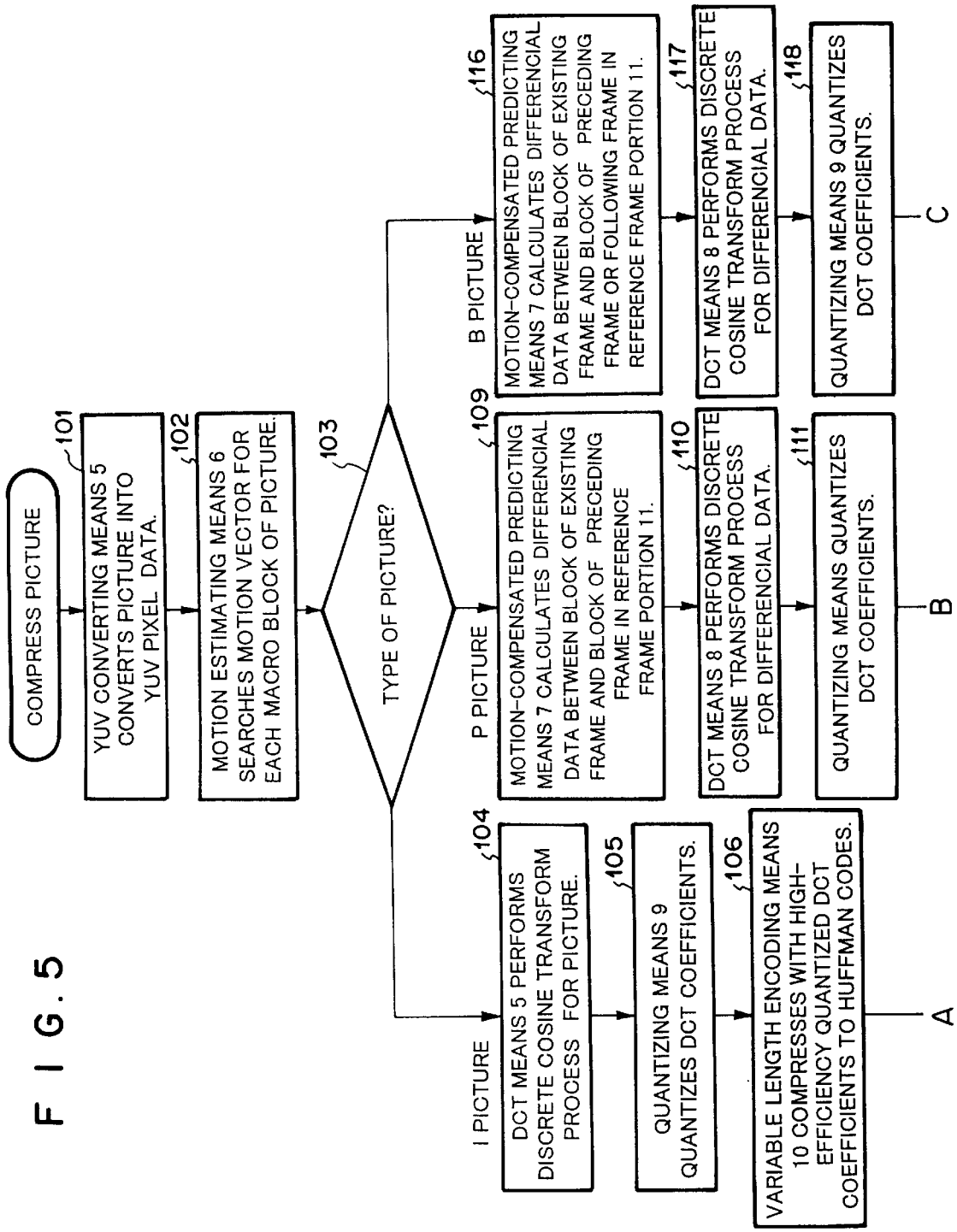
FIG. 5 is a first part of a flow chart for explaining a picture compressing process according to an embodiment of the present invention.

FIGS. 5 and 6 show a first part and a second part of a flow chart of a picture compressing process, respectively.

As seen from FIGS. 1, 5, and 6, in the picture compressing process, the YUV converting means 5 converts RGB pixel data into YUV pixel data (at step 101). The motion estimating means 6 searches for a motion vector of each macro block of the picture (at step 102), determines the type of the picture (at step 103), and performs a predetermined process corresponding to the type of the picture.

In the case of I pictures, they are compressed as follows. The DCT means 8 performs the discrete cosine transform process for the YUV pixel data to generate DCT coefficients (at step 104). The quantizing means 9 quantizes the DCT coefficients (at step 105). The variable length encoding means 10 compresses with high-efficiency the quantized DCT coefficients to Huffman codes (at step 106). The dequantizing means 14 dequantizes the quantized DCT coefficients (at step 107). The IDCT means 13 performs the inverse discrete cosine transform process for the dequantized DCT coefficients to regenerate YUV pixel data and they are stored in reference frame portion 11 (at step 108).

In the case of P pictures, they are compressed as follows. The motion-compensated predicting means 7 calculates the differential data between the block of the existing block and the block of preceding frame read out from reference frame portion 11 with displacement assigned by motion vector (at step 109). The DCT means 8 performs the discrete cosine transform process for the differential data to generate DCT coefficients (at step 110). The quantizing means 9 quantizes the DCT coefficients (at step 111). The variable length encoding means 10 compresses with high-efficiency the quantized DCT coefficients to Huffman codes (at step 112). The dequantizing means 14 dequantizes the quantized DCT coefficients (at step 113). The IDCT means 13 performs the inverse discrete transform process for the dequantized DCT coefficients to regenerate differential data (at step 114). The motion compensating means 12 displaces the data in preceding frame read out from the reference frame portion 11 in accordance with motion vector and adds the differential data to the displaced data. The sum are stored in reference frame portion 11 (at step 115).

In the case of B pictures, they are compressed as follows. The motion-compensated predicting means 7 calculates the differential data between the block of the existing block and the block of preceding or following frame read out from reference frame portion 11 with displacement assigned by motion vector (at step 116). The DCT means 8 performs the discrete cosine transform process for the differential data to generate DCT coefficients (at step 117). The quantizing means 9 quantizes the DCT coefficients (at step 118). The variable length encoding means 10 compresses with high-efficiency the quantized DCT coefficients to Huffman codes (at step 119). The dequantizing means 14 dequantizes the quantized DCT coefficients (at step 120). The IDCT means 13 performs the inverse discrete transform process for the dequantized DCT coefficients to regenerate differential data (at step 121). The motion compensating means 12 displaces the data in preceding or following frame read out from the reference frame portion 11 in accordance with motion vector and adds the differential data to the displaced data. The sum are stored in reference frame portion 11 (at step 122).

FIG. 7 is a flow chart for explaining the process of creating compression program according to an embodiment of the present invention.

The system creates a YUV converting module of the existing CPU with arguments "X" (X is the ID of existing CPU) and "YUV_Conversion" (at step 131). Next, the system creates a motion estimating module of the existing CPU with arguments "X" (X is the ID of existing CPU) and "Motion_Estimating" (at step 132).

Thereafter, the system creates a motion-compensated predicting module of the existing CPU with arguments "X" (X is the ID of existing CPU) and "Motion_Compensated_Predicting" (at step 133). The system creates a DCT module of the existing CPU with arguments "X" (X is the ID of existing CPU) and "DCT" (at step 134).

The system creates a quantizing module of the existing CPU with arguments "X" (X is the ID of existing CPU) and "Quantizing" (at step 135). The system creates a variable length encoding module of the existing CPU with arguments "X" (X is the ID of existing CPU) and "Variable_Length_Code_Encoding" (at step 136). The system creates a dequantizing module with arguments "X" (X is the ID of existing CPU) and "Dequantizing" (at step 137).

The system creates an IDCT module of the existing CPU with arguments "X" (X is the ID of existing CPU) and "IDCT" (at step 138). The system creates a motion compensating module of the existing CPU with arguments "X" (X is the ID of existing CPU) and "Motion_Compensating" (at step 139).

FIG. 8 is a flow chart for explaining a process of the apparatus controlling means 21 of the picture reproducing apparatus shown in FIG. 2.

The system compares the ID of the existing CPU 22 with the CPU ID of the existing program data 31 (at step 141) and determines whether or not they match (at step 142). Only if the determined result is No, the system creates a reproducing program (at step 143). Next, the system reproduces pictures (at step 144) and determines whether or not all frames have been reproduced (at step 145). When the determined result is No, the flow returns to step 144.

FIG. 9 is a flow chart for explaining a picture reproducing process according to an embodiment of the present invention.

The variable length decoding means 25 (see FIG. 2) decodes compressed codes to regenerate quantized DCT coefficients (at step 161), determines the type of the picture (at step 162), and processes the picture corresponding to the type.

In the case of I pictures, picture data are reproduced as follow,. The dequantizing means 26 (see FIG. 2) dequantizes the quantized DCT coefficients (at step 163). The IDCT means 27 (see FIG. 2) performs the inverse discrete cosine transform process for the dequantized DCT coefficients to regenerate YUV pixel data. The YUV pixel data is stored in the reference frame portion 29 (at step 164). The RGB converting means 28 (see FIG. 2) converts the YUV pixel data into RGB pixel data (at step 165).

In the case of P pictures, picture data are reproduced as follows. The dequantizing means 28 (see FIG. 2) dequantizes the quantized DCT coefficients (at step 166). The IDCT means 27 (see FIG. 2) performs the inverse discrete cosine transform process for the dequantized DCT coefficients to regenerate differential data (at step 167). The data of preceding frame read out from the reference frame portion 29 (see FIG. 2) is motion compensated by the motion compensating means 30 (see FIG. 2) and added to the differential data to regenerate YUV pixel data in the present frame and the YUV pixel data is stored in the reference frame portion 29 (at step 168). The RGB converting means 28 (see FIG. 2) converts the YUV pixel data into RGB pixel data (at step 169).

In the case of B pictures, picture data are reproduced as follows. The dequantizing means 28 (see FIG. 2) dequantizes the quaitized DCT coefficients (at step 170). The IDCT means 27 (see FIG. 2) performs the inverse discrete cosine transform process for the dequantized DCT coefficients to regenerate differential data (at step 171). The data of preceding or following frame read out from the reference frame portion 29 (see FIG. 2) is motion compensated by the motion compensating means 30 (see FIG. 2) and added to the differential data to regenerate YUV pixel data in the present frame and the YUV pixel data is stored in the reference frame portion 29 (at step 172). The RGB converting means 28 (see FIG. 2) converts the YUV pixel data into RGB pixel data (at step 173).

Figure 10:
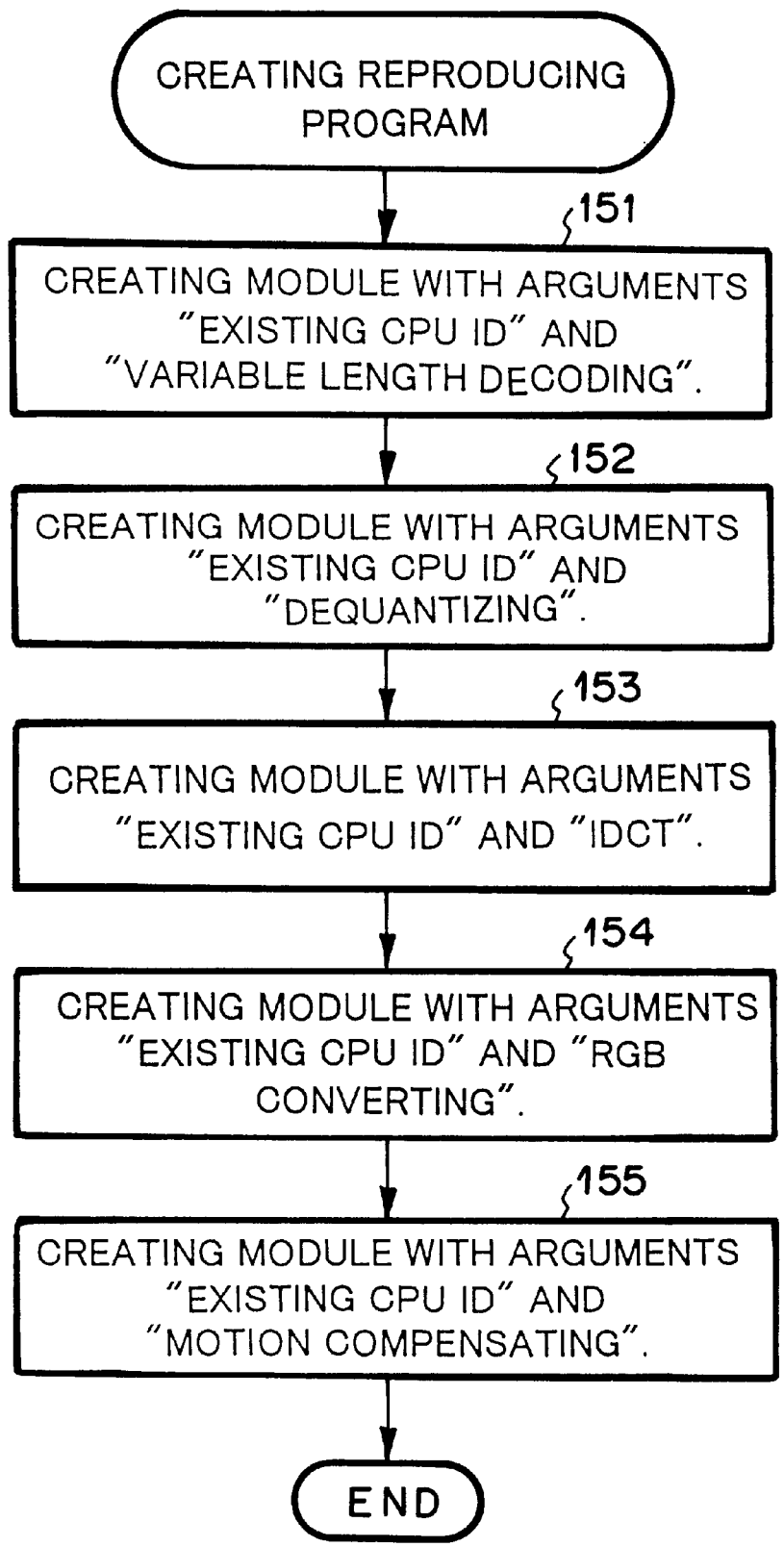
FIG. 10 is a flow chart for explaining a reproducing program creating process according to an embodiment of the present invention.

FIG. 10 is a flow chart for explaining the process of creating reproduction program according to an embodiment of the present invention.

The system creates a variable length decoding module of the existing CPU with arguments "X" (X is the ID of existing CPU) and "Variable_Length_Code_Decoding" (at step 151). The system creates a dequantizing module of the existing CPU with arguments "X" (X is the ID of existing CPU) and "Dequantizing" (at step 152). The system creates an IDCT module of the existing CPU with arguments "X" (X is the ID of existing CPU) and "IDCT" (at step 153).

The system creates an RGB converting module of the existing CPU with arguments "X" (X is the ID of existing CPU) and "RGB_Converting" (at step 154). The system creates a motion compensating module of the existing CPU with arguments "X" (X is the ID of existing CPU) and "Motion_Compensating" (at step 155).

Figure 11:
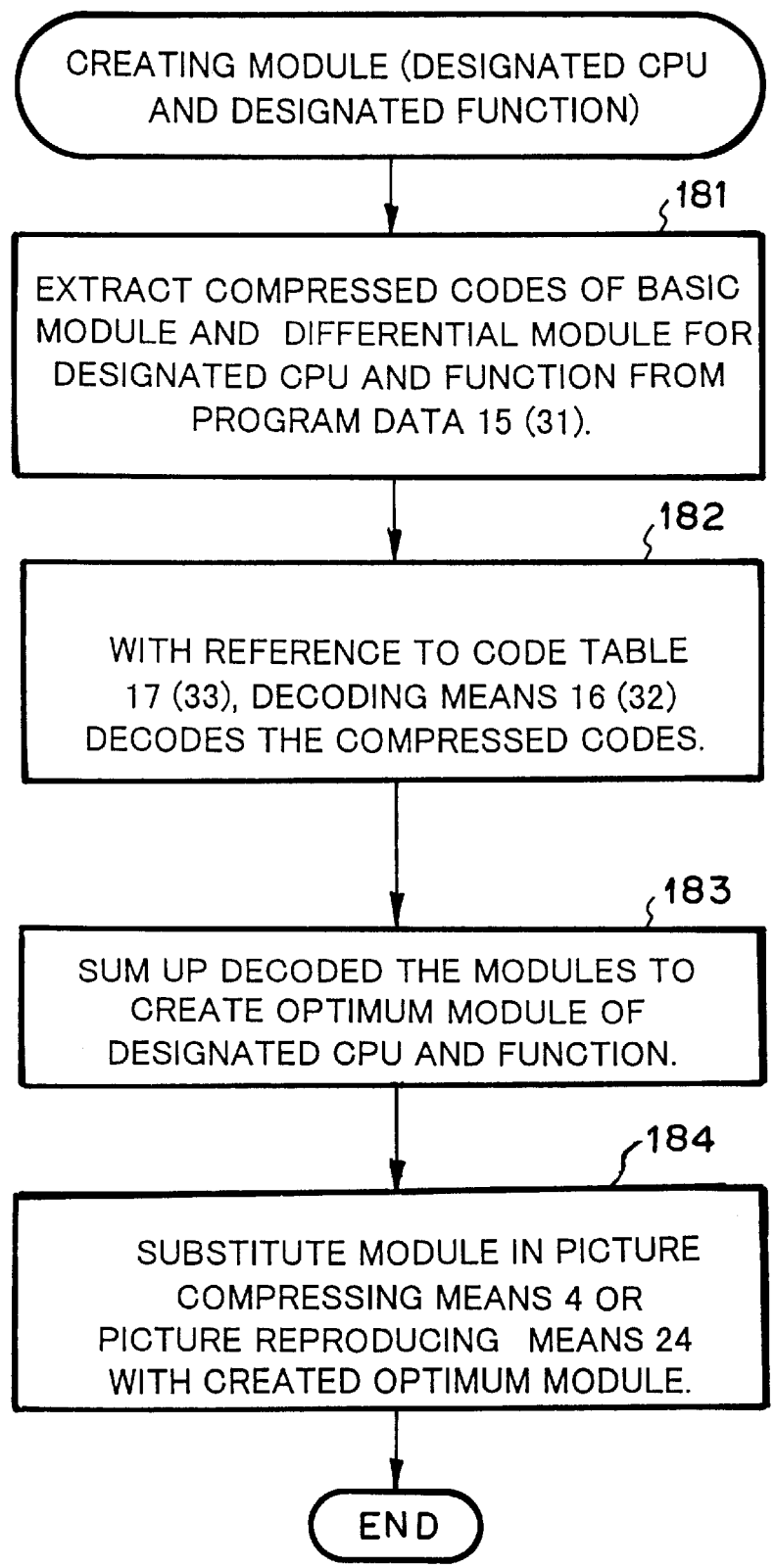
FIG. 11 is a flow chart for explaining a module creating process according to an embodiment of the present invention.
Figure 25:
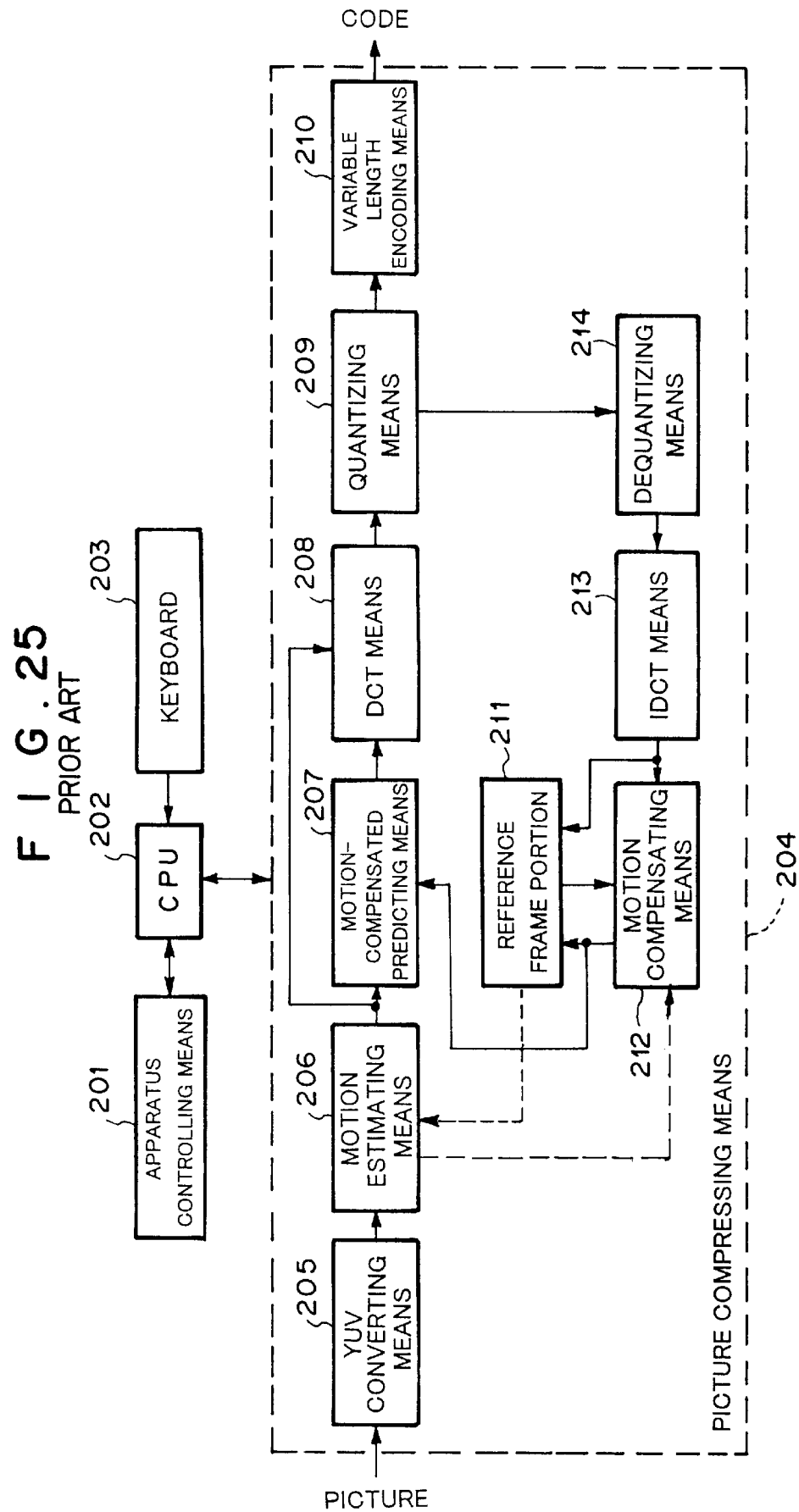
FIG. 25 is a block diagram showing the structure of a conventional picture compressing apparatus.
Figure 26:
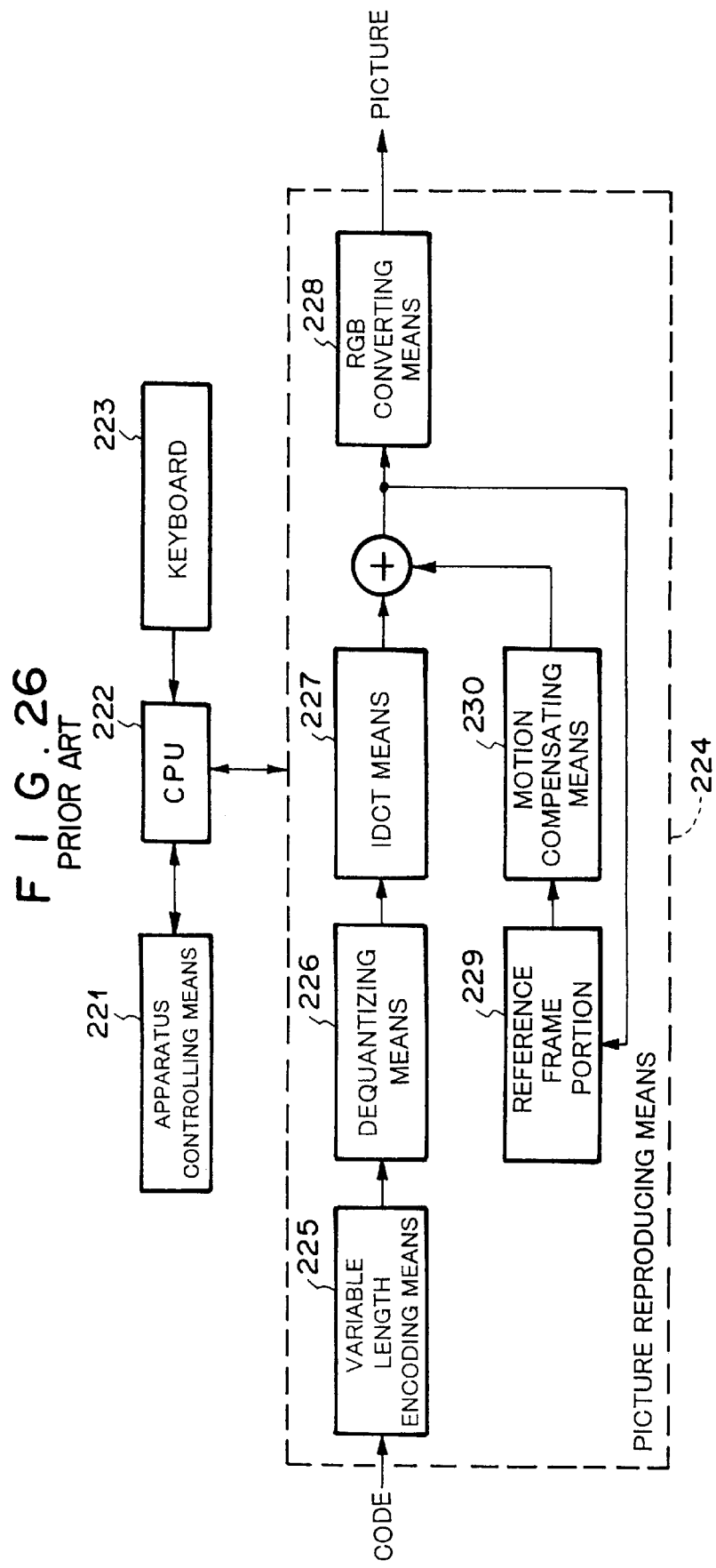
FIG. 26 is a block diagram showing the structure of a conventional picture reproducing apparatus.

FIG. 11 is a flow chart showing a process of creating each module shown in FIG. 7 or 10 with arguments of "designated CPU" and "designated function".

The apparatus controlling means 1 (21) extracts the compressed codes of the basic module of designated function and the compressed codes of the differential module corresponding to designated function and designated CPU from the program data 15 (31) (at step 181).

Next, with reference to the code table 17 (33), the decoding means 16 (32) decodes codes in both modules (at step 182). The system combines the decoded differential module and the decoded basic module to create an optimum module for the designated CPU (at step 183).

The system substitutes the module in the picture compressing means 4 (or the picture reproducing means 24) with the created optimum module (at step 184).

Next, with reference to the accompanying drawings, an embodiment of the present invention will be described in detail. In the following description, it is assumed that an Intel 80×86 processor is used.

FIGS. 12 and 13 are a first part and a second part of a list showing the structure of difference codes of program data, respectively. FIG. 12(A) shows an example of a program code. An instruction shown in FIG. 12(A) is used to move the content of a register bx to a register ax. As shown in FIG. 12(A), a program instruction (mov ax, bx) is divided into an operation code and operands. For an operand, a register is often used as shown in this example. Thus, some differential codes represent the change in the unit of instruction and the other differential codes represent changes in the unit of operation code, operand, and register.

FIG. 12(B) shows the list of the difference codes. As shown in FIG. 12(B), each difference code is composed of one byte.

"00" represents that no change arises.

"01" represents that the types of all the registers is changed from 32 bits to 16 bits.

"02" represents that the types of all the registers are changed from 16 bits to 32 bits.

"03" represents that the type of the first register is changed from 32 bits to 16 bits.

"04" represents that the type of the first register is changed from 16 bits to 32 bits.

"05" represents that the type of the second register is changed from 32 bits to 16 bits.

"06" represents that the type of the second register is changed from 16 bits to 32 bits.

"07" represents that the operand is substituted with the operand preceded by the difference code.

"08" represents that the first register is substituted with the register preceded by the difference code.

"09" represents that the second register is substituted with the register preceded by the difference code.

"0A" represents that the operation code is substituted with the operation code preceded by the difference code.

"0B" represents that the instruction of the existing line is substituted with the instruction preceded by the difference code.

"0C" represents that the instruction preceded by the difference code is inserted between the preceding line and the existing line.

"0D" represents that lines from the existing line to the line of the numeric value preceded by the difference code are substituted with the program code preceded by the numeric value.

"0E" represents that the program codes preceded by the numeric value is inserted between the preceding line and the existing line for the number of lines designated by the numeric value preceded by the difference code.

"0F" represents that the existing line is deleted.

"10" represents that the lines from existing line by the number designated by numeric value preceded by difference code are deleted.

"11" represents that the existing line and the next line are exchanged.

"12" represents that the existing line and the line designated by numeric value preceded by difference code are exchanged.

FIG. 13(C) is a list showing an example of the string of difference codes of program data. The first two codes represent the start line and the last line of the range in which difference exist.

"0010" is a two-byte BCD (Binary Coded Decimal) code that represents the start line number from which difference exists.

"0014" is a two-byte BCD code that represents the last line number to which difference exists.

"01", "04", "00", "0B, 'inc ax'", "00" represents difference codes arranged in the ascending order of line numbers.

When there is another range of lines in which difference exist, the start line number and the last line number are described as, for example, "0040" and "0045", respectively. After the last line number, difference codes are described in the ascending order of the line numbers. When there is no more line in which difference exist, "0000" is described.

In this embodiment, difference codes are described only for the range of lines in which difference exists in an aforementioned manner, the data size of the difference file becomes small. The data size of the difference file becomes smaller because, on the contrary to that an instruction is normally composed of three bytes of more, difference code is composed of only one byte.

In addition, since similar difference codes are arranged, when they are compressed by the entropy encoding method, the data size of the difference file becomes further decreased.

FIGS. 14 and 15 show an example in which a basic quantizing module is substituted with a quantizing optimum module for a CPU B. FIG. 14(A) shows program codes of a basic quantizing module. FIG. 14(B) shows program codes of the quantizing optimum module for the CPU B. FIG. 14(C) shows a top portion of difference codes of a quantizing differential module for the CPU B. FIG. 15 shows difference codes portion of the quantizing differential module for the CPU B.

Referring to FIG. 15, to create the optimum quantizing module for the CPU B, the following changes are performed.

Since the line "0020" describes the difference code "01", the types of all the registers are changed from 32 bits to 16 bits. Since the line "0021" describes the difference code "01", the types of all the registers are changed from 32 bits to 16 bits. Since the line "0022" describes the difference code "01", the types of all the registers are changed from 32 bits to 16 bits. Since the lines "0023" and "0024" describe the difference code "01", the types of all the registers are changed from 32 bits to 16 bits.

Since the line "0025" describes the difference code "0C", the program code "push ax"0 preceded by the difference code is inserted between the preceding line and the existing line. Since the line "0026" describes the difference code "0C", the program code "mov ax, cx"0 preceded by the difference code is inserted between the preceding line and the existing line. Since the line "0027" describes the difference code "07", the operand of the basic module of the line "0025" is substituted with the operand "dx"0 preceded by the difference code. Since the line "0028" describes the difference code "0C", the program code "mov cx, ax"0 preceded by the difference code is inserted between the preceding line and the existing line. Since the line "0028" describes the difference code "01", the types of all the registers are changed from 32 bits to 16 bits.

Since the line "0030" describes the difference code "0C", the program code "pop ax"0 preceded by the difference code is inserted between the preceding line and the existing line. Since the line "0031" describes the difference code "01", the types of all the registers are changed from 32 bits to 16 bits. Since the line "0032" describes the difference code "01", the types of all the registers are changed from 32 bits to 16 bits.

FIGS. 16 and 17 show an example of a process in which a basic DCT module is substituted with a DCT optimum module for the CPU B. FIG. 16(A) shows program codes of a basic DCT module. FIG. 16(B) shows program codes of the DCT optimum module for the CPU B. FIG. 16(C) shows a top portion of difference codes of a DCT differential module for the CPU B. FIG. 17 shows difference codes portion of the DCT differential module for the CPU B.

Referring to FIG. 17, to create an optimum DCT module for the CPU B, the following changes are performed.

Since the line "0020" describes the difference code "03", the type of the first register is changed from 32 bits to 16 bits. Since the line "0021" describes the difference code "03", the type of the first register is changed from 32 bits to 16 bits. Since the line "0022" describes the difference code "01", the types of all the registers are changed from 32 bits to 16 bits. Since the line "0023" describes the difference code "01", the types of all the registers are changed from 32 bits to 16 bits. Since the line "0024" describes the difference code "03", the type of the first register is changed from 32 bits to 16 bits. Since the line "0025" describes the difference code "03", the type of the first register is changed from 32 bits to 16 bits. Since the line "0026" describes the difference code "01", the types of all the registers are changed from 32 bits to 16 bits. Since the line "0027" describes the difference code "01", the types of all the registers are changed from 32 bits to 16 bits. Since the line "0028" describes the difference code "00", no change is performed. Since the line "0029" describes the difference code "0B", the existing line is substituted with the program code "shr ax, cl" preceded by the difference code. Since the line "0030" describes the difference code "0D", the program codes "neg cl" and "add cl, 16" preceded by the difference code are inserted between the preceding line and the existing line. Since the line "0032" describes the difference code "0C", the program code "shr dx, cl" preceded by the difference code is inserted between the preceding line and the existing line. Since the line "0033" describes the difference code "0C", the program code "or ax, dx"0 proceeded by the difference code is inserted between the preceding line and the existing line.

Since the line "0034" describes the difference code "03", the type of the first register of the basic module of line "0030" is changed from 32 bits to 16 bits.

FIGS. 18 and 19 show an example of a process in which a basic motion compensating module is substituted with a motion compensating optimum module for the CPU B. FIG. 18(A) shows program codes showing the basic motion compensating module. FIG. 18(B) shows program codes of the motion compensating optimum module for the CPU B. FIG. 18(C) shows a top portion of a motion compensating differential module for the CPU B. FIG. 19 shows a difference codes portion of the motion compensating differential module for the CPU B.

Referring to FIG. 19, to create the optimum motion compensating module for the CPU B, the following changes are performed.

Since the line "0020" describes the difference code "01", the types of all the registers are changed from 32 bits to 16 bits. Since the line "0021" describes the difference code "01", the types of all the registers are changed from 32 bits to 16 bits. Since the line "0022" describes the difference code "00", no change is performed. Since the line "0023" describes the difference code "00", no change is performed.

Since the lines "0024" to "0029" describe the difference code "00", no change is performed. Since the line "0030" describes the difference code "0C", the program code "mov [si], dx"0 preceded by the difference code is inserted between the preceding line and the existing line. Since the line "0031" describes the difference code "0B", the line "0030" of the basic module is substituted with the program code "mov dx, [si+2]" preceded by the difference code. Since the line "0032" describes the difference code "0B", the existing line is substituted with the program code "mov cx, [di+2]" preceded by the difference code. Since the line "0033" describes the difference code "00", no change is performed.

FIGS. 20 and 21 show an example of a process in which a basic YUV converting module is substituted with an YUV converting optimum module for the CPU B. FIG. 20(A) shows program codes of the basic YUV converting module. FIG. 20(B) shows program codes of the YUV converting optimum module for the CPU B. FIG. 20(C) shows a top portion of difference codes of a YUV converting differential module for the CFU B. FIG. 21 shows a difference codes portion of the YUV converting differential module for the CPU B.

Referring to FIG. 21, to create the optimum YUV converting module for the CPU B, the following changes are preformed.

Since the line "0020" describes the difference code "03", the type of the first register is changed from 32 bits to 16 bits. Since the line "0021" describes the difference code "03", the type of the first register is changed from 32 bits to 16 bits. Since the line "0022" describes the difference code "03", the type of the first register is changed from 32 bits to 16 bits. Since the line "0023" describes the difference code "00", no change is performed.

Since the line "0024" describes the difference code "01", the types of all the registers are changed from 32 bits to 16 bits. Since the line "0025" describes the difference code "03", the type of the first register is changed from 32 bits to 16 bits. Since the line "0026" describes the difference code "00", no changed is performed. Since the line "0027" describes the difference code "01", the types of all the registers are changed from 32 bits to 16 bits. Since the line "0028" describes the difference code "0C", the program code "adc dx, 0" preceded by the difference code is inserted between the preceding line and the existing line. Since the line "0029" describes the difference code "03", the type of the register of the basic module of the line "0028" is changed from 32 bits to 16 bits. Since the line "0030" describes the difference code "0C", the program code "adc dx, 0" preceded by the difference code is inserted between the preceding line and the existing line. Since the line "0031" describes the difference code "03", the type of the first register is changed from 32 bits to 16 bits.

Since the line "0032" describes the difference code "0C", the program code "mov bh, dl" preceded by the difference code is inserted between the preceding line and the existing line. Since the line "0033" describes the difference code "03", the type of the first register is changed from 32 bits to 16 bits. Since the line "0034" describes the difference code "00", no changed is performed. Since the line "$00_{35}$" describes the difference code "03", the type of the first register is changed from 32 bits to 16 bits. Since the line "0036" describes the difference code "03", the type of the first register is changed from 32 bits to 16 bits.

FIGS. 22 and 23 show an example of a process in which a basic variable length encoding module is substituted with a variable length encoding optimum module for the CPU B. FIG. 22(A) shows program codes of the basic variable length encoding module. FIG. 22(B) shows program codes of the variable length encoding optimum module for the CPU B. FIG. 22(C) shows a top portion of difference codes of the optimum variable length encoding module for the CPU B. FIG. 23 shows a difference code portion of the variable length encoding differential module for the CPU B.

Referring to FIG. 23, to create the optimum variable length encoding module of the CPU B, the following changes are performed.

Since the line "0020" describes the difference code "0C", the program code "xchg bh, b1" preceded by the difference code is inserted between the preceding line and the existing line. Since the line "0021" describes the difference code "0A", the existing line is substituted with the program code "xchg dh, d1" preceded by the difference code. Since the line "0022" describes the difference code "01", the types of all the registers are changed from 32 bits to 16 bits.

Since the line "0023" describes the difference code "0C", the program code "mov [di+2], dx"0 is inserted between the preceding line and the existing line. Since the line "0024" describes the difference code "03", the type of the first register is changed from 32 bits to 16 bits.

As described above, since the program for picture compression and reproduction executable on plural kind of CPU and DSP is consist of the basic modules and plural sets of differential modules corresponding to each CPU and DSP and they are compressed by entropy coding, the capacity of the program is reduced while maintaining the adaptability to plural kind of CPUs and DSPs.

In addition, according to the present invention, once an optimum compressing/reproducing program of each CPU, DSP, and so forth is created, unless they are changed, it is not necessary to create an additional compressing/reproducing program.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. A picture compressing apparatus which compresses picture data by causing a processor to execute a program for performing an intra-frame encoding process, a forward inter-frame process and a bidirectional inter-frame encoding process, wherein said intra-frame encoding process comprises dividing the present frame into small blocks, performing DCT (Discrete Cosine Transform) process for each of the small blocks, quantizing the transformed result, and encoding the quantized result, wherein said forward inter-frame encoding process comprises dividing the present frame into small blocks, searching through the preceding frame for a small block which minimizes the difference between each of the small blocks in the present frame and the searched small block, obtaining the differential data between each of the small blocks in the present frame and the searched small block, performing the DCT process for the differential data, quantizing the transformed result, and encoding the quantized result, and wherein said bidirectional inter-frame encoding process comprises dividing the present frame into small blocks, searching through the preceding frame and the following frame for a small block which minimizes the difference between each of the small blocks in the present frame and the searched small block, obtaining the differential data between each of the small blocks in the present frame and the searched small block, performing the DCT process for the differential data, quantizing the transformed result, and encoding the quantized result, and wherein a program data for said program is composed of at least a first basic module and differential modules for the first basic module, each of which corresponds to a processor type, and a second basic module and differential modules for the second basic module, each of which corresponds to a processor type, the apparatus comprising:

means for storing the program data for said program;

means for detecting the processor type which is being currently used; and means for creating the program for the detected processor type with at least the first basic module and one of the differential for the first basic module corresponding to the detected processor type and the second basic module and one of the differential modules for the second basic module corresponding to the detected processor type.

2. The picture compressing apparatus as set forth in claim 1, wherein the basic module and the difference file has been entropy encoded, and wherein the apparatus further comprises:

means for decoding the basic module and the differential modules that has been entropy encoded.

3. The picture compressing apparatus as set forth in claim 1, wherein the basic module and the differential modules are divided into small modules corresponding to each function.

4. A picture reproducing apparatus which reproduces picture data by causing a processor to execute a program for performing a reproducing process, wherein said reproducing process comprises decoding picture codes to regenerate quantized DCT coefficients, dequantizing the quantized DCT coefficients to regenerate dequantized DCT coefficients, performing IDCT (Inverse Discrete Cosine Transform) for the dequantized DCT coefficients to regenerate pixel data or differential data, storing the regenerated pixel data in a reference frame portion, reading out pixel data from the reference frame portion, compensating the motion of the read pixel data, and adding the differential data to the motion compensated pixel data, and wherein a program data for said program is composed of at least a first basic module and differential modules for the first basic module, each of which corresponds to a processor type, and a second basic module and differential modules for the second basic module each of which corresponds to a processor type, the apparatus comprising:

means for storing the program data for said program;

means for detecting the processor type which is being currently used; and means for creating the program for the detected processor type with at least the first basic module and one of the differential for the first basic module corresponding to the detected processor type and the second basic module and one of the differential modules for the second basic module corresponding to the detected processor type.

5. The picture reproducing apparatus as set forth in claim 4, wherein the basic module and the difference file has been entropy encoded, and wherein the apparatus further comprises:

means for decoding the basic module and the differential modules that has been entropy encoded.

6. The picture reproducing apparatus as set forth in claim 4, wherein the basic module and the differential modules are divided into small modules corresponding to each function.

7. The picture compressing apparatus as set forth in claim 1, wherein the program includes first and second program modules, and the first basic module includes program elements that are common to the first program modules of different processor types, and the second basic module includes program elements that are common to the second program modules of different processor types.

8. The picture reproducing apparatus as set forth in claim 4, wherein the program includes first and second program modules, and the first basic module includes program elements that are common to the first program modules of different processor types, and the second basic module includes program elements that are common to the second program modules of different processor types.

9. A method of generating a program for use by a processor in executing a plurality of functions related to picture compression or reproduction, wherein the program includes a plurality of program modules each of which corresponds to one of the functions related to picture compression or reproduction, said method comprising the steps of:

(a) accessing a program data memory in which basic modules each corresponding to one of the program modules and at least two differential modules for each of the basic modules are stored;

(b) extracting one of the basic modules from the program data memory;

(c) extracting a differential module from the at least two differential modules corresponding to the extracted basic module from the program data memory;

(d) combining the extracted basic module and the extracted differential module to produce one of the program modules of the program; and (e) repeating steps (b)–(d) until all of the program modules of the program have been produced.

10. The method as set forth in claim 9, wherein each of the at least two differential modules for each of the basic modules corresponds to a particular type of processor and the differential module extracted in step (c) corresponds to the type of processor that is used to execute the plurality of functions related to picture compression or reproduction.

11. A picture compressing apparatus which compresses picture data by causing a processor to execute an optimum executable program for performing an intra-frame encoding process, a forward inter-frame encoding process and a bidirectional inter-frame encoding process, wherein said intra-frame encoding process comprises dividing the present frame into small blocks, performing DCT (Discrete Cosine Transform) process for each of the small blocks, quantizing the transformed result, and encoding the quantized result, wherein said forward inter-frame encoding process comprises dividing the present frame into small blocks, searching through the preceding frame for a small block which minimizes the difference between each of the small blocks in the present frame and the searched small block, obtaining the differential data between each of the small blocks in the present frame and the relevant searched small block, performing the DCT process for the differential data, quantizing the transformed result, and encoding the quantized result, said bidirectional inter-frame encoding process comprises dividing the present frame into small blocks, searching through the preceding frame and the following frame for a small block which minimizes the difference between each of the small blocks in the present frame and the searched small block, obtaining the differential data between each of the small blocks in the present frame and the relevant searched small block, performing the DCT process for the differential data, quantizing the transformed result, and encoding the quantized result, and wherein said apparatus comprises:

means for storing basic source modules and differential modules;

means for detecting the processor type which is being currently used;

means for creating an optimum source module for an optimum executable module for the detected processor type by modifying each of the basic sources module with differential codes in each of the differential modules, each of said differential codes expressing difference between the optimum source module and the basic source module in instruction basis, operation code basis, or operand basis;

means for creating an optimum source program by combining a plurality of the optimum source modules; and means for assembling an optimum executable program from the optimum source program.

12. The picture compressing apparatus as set forth in claim 11, wherein said basic source modules and said differential modules have been entropy-encoded, and wherein said apparatus further comprises means for decoding said basic source modules and said differential module which have been entropy-encoded.

13. A picture reproducing apparatus which reproduces picture data by causing a processor to execute an optimum program for performing a reproducing process, wherein said reproducing process comprises decoding picture codes to regenerate quantized DCT coefficients, dequantizing the quantized DCT coefficients to regenerate dequantized DCT coefficients, performing IDCT (Inverse Discrete Cosine Transform) for the dequantized DCT coefficients to regenerate pixel data or differential data, storing the regenerated pixel data in a reference frame portion, reading out pixel data from the reference frame portion, compensating the motion of the read pixel data, and adding the differential data to the motion compensated pixel data, wherein said apparatus comprises:

means for storing basic source modules and differential modules;

means for detecting the processor type which is being currently used;

means for creating an optimum source module for an optimum executable module for the detected processor type by modifying each of the basic sources module with differential codes in each of the differential modules, each of said differential codes expressing difference between the optimum source module and the basic source module in instruction basis, operation code basic, or operand basis;

means for creating an optimum source program by combining a plurality of the optimum source modules; and means for assembling an optimum executable program from the optimum source program.

14. The picture reproducing apparatus as set forth in claim 13, wherein said basic source modules and said differential modules have been entropy-encoded, and wherein the apparatus further comprises means for decoding said basic source modules and the differential modules which have been entropy-encoded.

* * * * *